(12) United States Patent
LaBudde et al.

(10) Patent No.: US 6,537,505 B1
(45) Date of Patent: Mar. 25, 2003

(54) REAGENT DISPENSING VALVE

(75) Inventors: Edward V. LaBudde, Westlake Village, CA (US); Anthony D. Wilson, Glendora, CA (US)

(73) Assignee: BIO DOT, Inc., Irvine, CA (US)

( * ) Notice: Subject to any disclaimer, the term of this patent is extended or adjusted under 35 U.S.C. 154(b) by 0 days.

(21) Appl. No.: 09/238,285

(22) Filed: Jan. 28, 1999

(Under 37 CFR 1.47)

Related U.S. Application Data

(60) Provisional application No. 60/075,400, filed on Feb. 20, 1998.

(51) Int. Cl.[7] .............................. B01L 11/00; B01L 3/02; B67D 3/00; B65D 47/00; F16K 31/02
(52) U.S. Cl. ...................... 422/103; 422/100; 222/504; 222/559; 251/129.17; 251/129.18; 73/863.32; 73/864; 73/864.13; 73/864.16; 73/864.14
(58) Field of Search .................................. 422/100, 103; 222/504, 559; 251/129.17, 129.18; 73/863.23, 863.32, 863.72, 863.86, 864, 864.01, 864.13, 864.14, 864.16, 864.91

(56) References Cited

U.S. PATENT DOCUMENTS

| 3,162,340 A | 12/1964 | Erickson |
| 3,704,833 A | 12/1972 | Wheat |
| 3,740,019 A | * 6/1973 | Kessel et al. ............... 251/129 |

(List continued on next page.)

FOREIGN PATENT DOCUMENTS

| EP | 0268237 | 5/1988 |
| EP | 0326510 | 8/1989 |
| WO | WO 92/18608 | 10/1992 |
| WO | WO 97/16251 | 5/1997 |
| WO | WO 98/04358 | 2/1998 |
| WO | WO 99/34931 | 7/1999 |
| WO | WO 99/42804 | 8/1999 |

OTHER PUBLICATIONS

Copy of International Search Report in Connection with International Appln. No. PCT/US99/02884, filing date Feb. 11, 1999.
Currie, I.G., Fundamental Mechanics of Fluids, 1974, pp. 40 & 41.
Middleman, Stanley, Modeling Axisymmetric Flows–Dynamics of Films, Jets, and Drops, 1995, pp. 97–103.
Microfabrication & Microfluidic Technologies—Advances in the Miniaturization of Bioanalytical Devices, *International Business Communications*, Aug. 7 & 8, 1997.
Imagene Technology Brochure, IsoFlow™ Linear Reagent Dispenser, not dated.
Biodot X–Y Membrane Handling Module with Dispensing Platform—Series XY 3000, BioDot, Inc. Brochure, Aug. 1994.

(List continued on next page.)

*Primary Examiner*—Jill Warden
*Assistant Examiner*—Brian R. Gordon
(74) *Attorney, Agent, or Firm*—Knobbbe, Martens, Olson & Bear LLP

(57) ABSTRACT

A reagent dispensing valve particularly adapted for dispensing precise microfluidic quantities of fluids. The valve includes a valve portion and a solenoid actuator that are in fluid isolation from one another. The valve portion includes a plunger and seat combination and the actuator is substantially decoupled from the fluid path through the valve. The fluid path through the valve is substantially non-tortuous, thereby minimizing localized fluid pressure drops, and hence undesirable gaseous bubble precipitation within the fluid. The valve is also configured to substantially prevent bubble accumulation. The valve can further include a bubble trap for trapping and removing bubbles.

105 Claims, 14 Drawing Sheets

U.S. PATENT DOCUMENTS

| | | | |
|---|---|---|---|
| 4,132,194 A | | 1/1979 | Saito |
| 4,200,607 A | | 4/1980 | Suzuki |
| 4,207,074 A | | 6/1980 | Suzuki |
| 4,223,558 A | | 9/1980 | Schmider et al. |
| 4,229,413 A | * | 10/1980 | Marteau d'Autry ......... 422/100 |
| 4,283,950 A | * | 8/1981 | Tervamaki ............... 73/864.14 |
| 4,284,604 A | * | 8/1981 | Tervamaki .................. 422/100 |
| 4,318,884 A | | 3/1982 | Suzuki |
| 4,323,537 A | | 4/1982 | Mody |
| 4,717,049 A | | 1/1988 | Green et al. |
| 4,818,492 A | | 4/1989 | Shimizu |
| 4,877,745 A | | 10/1989 | Hayes et al. |
| 4,926,701 A | | 5/1990 | Tompkins |
| 4,952,518 A | | 8/1990 | Johnson et al. |
| 5,158,748 A | | 10/1992 | Obi et al. |
| 5,169,600 A | | 12/1992 | Ishizaka et al. |
| 5,175,086 A | | 12/1992 | Takekawa et al. |
| 5,183,742 A | | 2/1993 | Omoto et al. |
| 5,301,921 A | * | 4/1994 | Kumar .................. 251/129.08 |
| 5,324,480 A | | 6/1994 | Shumate et al. |
| 5,333,643 A | * | 8/1994 | Gilchrist et al. ............ 137/605 |
| 5,334,353 A | | 8/1994 | Blattner |
| 5,338,688 A | | 8/1994 | Deeg et al. |
| 5,385,844 A | | 1/1995 | Kennamer et al. |
| 5,389,339 A | * | 2/1995 | Petschek et al. |
| 5,405,050 A | | 4/1995 | Walsh |
| 5,405,783 A | | 4/1995 | Pirrung et al. |
| 5,464,739 A | | 11/1995 | Johnson et al. |
| 5,474,744 A | | 12/1995 | Lerch |
| 5,506,142 A | | 4/1996 | Mahaffey et al. |
| 5,509,966 A | | 4/1996 | Sykes |
| 5,551,487 A | | 9/1996 | Gordon et al. |
| 5,593,839 A | | 1/1997 | Hubbell et al. |
| 5,593,893 A | | 1/1997 | Kobashi et al. |
| 5,601,980 A | | 2/1997 | Gordon et al. |
| 5,601,982 A | | 2/1997 | Sargent et al. |
| 5,636,788 A | | 6/1997 | Wilson |
| 5,639,426 A | | 6/1997 | Kerr et al. |
| 5,672,320 A | * | 9/1997 | Ritter ......................... 422/100 |
| 5,738,728 A | | 4/1998 | Tisone |
| 5,741,554 A | | 4/1998 | Tisone |
| 5,742,304 A | | 4/1998 | Richtsmeier et al. |
| 5,743,960 A | | 4/1998 | Tisone |
| 5,747,102 A | | 5/1998 | Smith et al. |
| 5,756,050 A | | 5/1998 | Ershow et al. |
| 5,763,278 A | | 6/1998 | Sickinger et al. |
| 5,770,151 A | | 6/1998 | Roach et al. |
| 5,770,160 A | | 6/1998 | Smith et al. |
| 5,807,522 A | | 9/1998 | Brown et al. |
| 5,807,524 A | | 9/1998 | Kelly et al. |
| 5,811,306 A | | 9/1998 | Komatsu |
| 5,865,421 A | * | 2/1999 | Ono ....................... 251/129.02 |
| 5,880,380 A | * | 3/1999 | Goldschmidt et al. ... 73/863.85 |
| 5,916,524 A | | 6/1999 | Tisone |
| 5,925,732 A | | 7/1999 | Ecker et al. |
| 6,010,213 A | * | 1/2000 | Kanaya et al. |
| 6,045,759 A | * | 4/2000 | Ford et al. .................. 422/103 |
| 6,187,270 B1 | * | 2/2001 | Schmitt et al. ............. 422/101 |
| 6,193,212 B1 | * | 2/2001 | Ohmi et al. ........... 251/129.16 |
| 6,328,276 B1 | * | 12/2001 | Falch et al. |
| 6,394,415 B1 | * | 5/2002 | Ohmi et al. ........... 251/129.16 |
| 6,416,713 B1 | * | 7/2002 | Ford et al. .................... 422/63 |
| 2002/0034456 A1 | * | 3/2002 | Ford et al. .................... 422/63 |

OTHER PUBLICATIONS

CV1000 Syringe Pump Dispenser, Bio Dot, Inc. Brochure, Aug. 1994.

BioDot Microdoser Dispenser Series MD–1000, BioDot, Inc. Brochure, Aug. 1994.

BioDot AirJet™ 2000 Dispenser, BioDot, Inc. Brochure, Aug. 1994.

BioJet™ Specification, BioDot, Inc. Brochure, Sep. 1995.

BioDot, Inc. Supplier of Innovative Equipment of R & D and Manufacturing of Biodianostic Test Kits, BioDot, Inc. Company Brochure, Sep. 1995.

BioDot Biostripe, BioDot, Inc. Brochure, 1998.

BioDot XYZ Dispensing Platform—XYZ 3000, BioDot, Inc. Brochure, 1998.

BioDot Immunioassay Starter Kits—SRM 100/SKS 100, SKP 100/ SUK 100–P, BioDot, Inc. Brochure, 1998.

BioDot Reel–to–Reel Web Handling Module–RR 3000, DioDot, Inc. Brochure, 1998.

BioDot MicroDoser Dispenser—MD 1000, BioDot, Inc. Brochure, 1998.

BioDot Guillotine Cutting Module—CM 4000, BioDot, Inc. Brochure, 1998.

BioDot Clamsheel Laminator and Roller System LM 5000, BioDot, Inc. Brochure, 1998.

BioDot BioJet Quanti3000 Dispenser—BJQ 3000, BioDot, Inc. Brochure, 1998.

BioDot Assembly Roller—AR 3000, BioDot, Inc. Brochure, 1998.

Arraylt™ Stealth Micro Spotting Technology, TeleChem International, Inc. Web Site, 1998.

Arraylt™ Bubble Micro Spotting Pins, TeleChem International, Inc. WebSite 1998.

Arraylt™ ChipMaker™ 2, TeleChem International, Inc. Web Site, 1999.

* cited by examiner

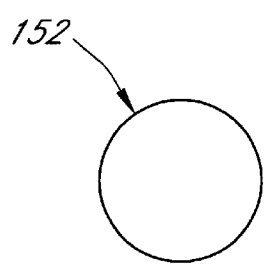
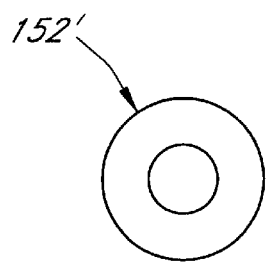
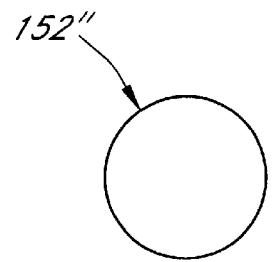
*FIG. 13A*  *FIG. 13B*  *FIG. 13C*
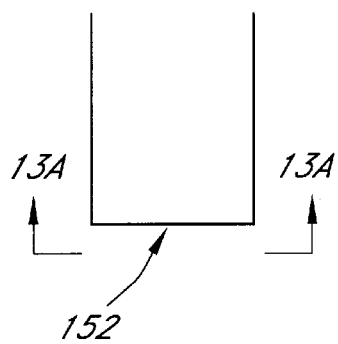
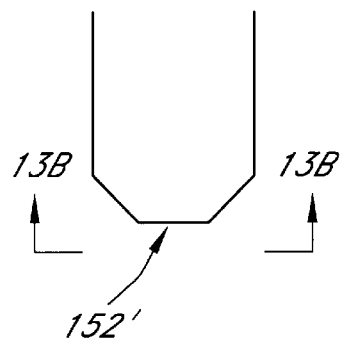
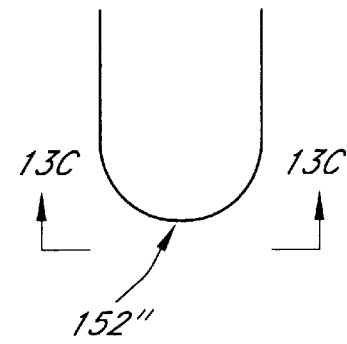
*FIG. 11A*  *FIG. 11B*  *FIG. 11C*
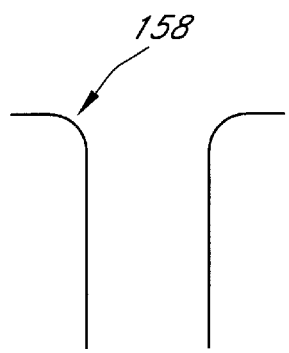
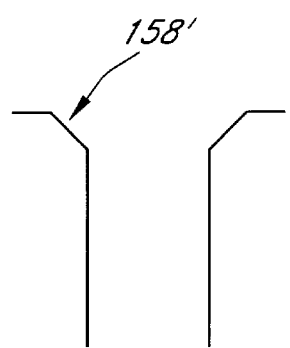
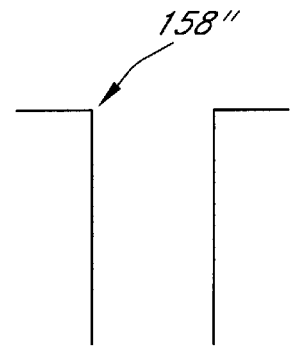
*FIG. 12A*  *FIG. 12B*  *FIG. 12C*

REAGENT DISPENSING VALVE

RELATED APPLICATIONS

This application claims the benefit of U.S. Provisional Application No. 60/075,400, filed Feb. 20, 1998.

BACKGROUND OF THE INVENTION

1. Field of the Invention

The present invention relates generally to an improved valve apparatus for dispensing chemical reagents and other liquids and, specifically, to a reagent dispensing valve that is particularly adapted for dispensing precise microfluidic quantities of chemical reagents.

2. Background of the Related Art

Clinical testing of various bodily fluids conducted by medical personnel are well established tools for medical diagnosis and treatment of various diseases and medical conditions. Such tests have become increasingly sophisticated, as medical advancements have led to many new ways of diagnosing and treating diseases.

The routine use of clinical testing for early screening and diagnosis of diseases or medical conditions has given rise to a heightened interest in simplified procedures for such clinical testing that do not require a high degree of skill or which persons may conduct on themselves for the purpose of acquiring information on a physiological relevant condition. Such tests may be carried out with or without consultation with a health care professional. Contemporary procedures of this type include blood glucose tests, ovulation tests, blood cholesterol tests and tests for the presence of human chorionic gonadotropin in urine, the basis of modem home pregnancy tests.

One of the most frequently used devices in clinical chemistry is the test strip or dip stick. These devices are characterized by their low cost and simplicity of use. Essentially, the test strip is placed in contact with a sample of the body fluid to be tested. Various reagents incorporated on the test strip react with one or more analytes present in the sample to provide a detectable signal.

Most test strips are chromogenic whereby a predetermined soluble constituent of the sample interacts with a particular reagent either to form a uniquely colored compound, as a qualitative indication of the presence or absence of the constituent, or to form a colored compound of variable color intensity, as a quantitative indication of the amount of the constituent present. These signals may be measured or detected either visually or via a specially calibrated machine.

For example, test strips for determining the presence or concentration of leukocyte cells, esterase or protease in a urine sample utilize chromogenetic esters which produce an alcohol product as a result of hydrolysis by esterase or protease. The intact chromogenetic ester has a color different from the alcohol hydrolysis product. The color change generated by hydrolysis of the chromogenetic ester, therefore provides a method of detecting the presence or concentration of esterase or protease, which in turn, is correlated to the presence or concentration of leukocyte cells. The degree and intensity of the color transition is proportional to the amount of leukocyte esterase or HLE detected in the urine. See U.S. Pat. No. 5,464,739.

The emergence and acceptance of such diagnostic test strips as a component of clinical testing and health care in general has led to the development of a number of quality diagnostic test strip products. Moreover, the range and availability of such products is likely to increase substantially in the future.

Because test strips are used to provide both quantitative and qualitative measurements, it is extremely important to provide uniformity in distribution of the reagents on the test strip substrate. The chemistry is often quite sensitive and medical practice requires that the testing system be extremely accurate. When automated systems are used, it is particularly important to ensure that the test strips are reliable and that the measurements taken are quantitatively accurate.

Application of one or more reagents to a test strip substrate is a highly difficult task. The viscosities and other flow properties of the reagents, their reactiveness with the substrate or other reagents vary from reagent to reagent, and even from lot to lot of the same reagent. It is also sometimes necessary or desirable to provide precise patterns of reagent on the test strip having predetermined reagent concentrations. For example, some test strips provide multiple test areas that are serially arranged so that multiple tests may be performed using a single test strip. U.S. Pat. No. 5,183,742, for instance, discloses a test strip having multiple side-by-side detection regions or zones for simultaneously performing various tests upon a sample of body fluid. Such a test strip may be used to determine, for example, levels of glucose, protein, and the pH of a single blood sample.

Typically, a micro-droplet dispensing apparatus is utilized in the preparation and/or analysis of test strips. Of course, micro-droplet dispensing is not limited in application to test strip fabrication and analysis, but it also has a wide variety of other research and non-research related applications in the biodiagnostics, pharmaceutical, agrochemical and material sciences markets. For example, dispensing technology is used in genomic research and analysis, drug screening, live cell dispensing and ink jet printing among others.

Moreover, in addition to dispensing, some applications may also involve aspiration of a chemical reagent or other liquid, wherein a quantity of fluid is aspirated ("sucked") from a source and then dispensed ("spat") into or onto a target for further testing and/or processing. For example, a typical application would include a source composed of a 96-microwell plate with a transfer of reagent to a glass slide, microwell plate or membrane.

For several years the industry has been developing dispensing methods based on the use of solenoid valve dispensers. Solenoid valve dispensers generally comprise a small solenoid activated valve which can be opened and closed electronically at high speeds. Solenoid valves of this type are commercially available from sources such as The Lee Company of Westbrook, Conn. The solenoid valve is typically connected to a pressurized vessel or reservoir containing the fluid to be dispensed. In operation, the solenoid is energized by a pulse of electrical current, which opens the valve for a pre-determined duty-cycle or open time. This allows a small volume of liquid to be forced through the nozzle forming a droplet which is then ejected from the valve onto the target. The size and frequency of the droplets and the amount of reagent flow onto the target is typically controlled by adjusting the frequency and pulse-width of energizing current provided to the solenoid valve and/or by adjusting the pressure of the reservoir.

There are several major limitations associated with using a conventional solenoid valve, such as the Lee valve, as a drop-on-demand valve in a reagent dispensing system. The Lee valve generally comprises a solenoid actuator element and a valve element with these two elements being integrated to form a unitary component. The various components of the valve element present a tortuous path for the fluid to flow through. Such a tortuous fluid path results in significant disadvantages, such as localized pressure drops which undesirably lead to bubble precipitation of air or gas in solution. The entrapment of these bubbles in the fluid path can not only degrade the quality of the reagent or liquid dispensed but can also render the dispenser susceptible to clogging. Thus conventional dispensing valves require frequent purges of the fluid into a waste receptacle, thereby, disadvantageously, reducing process efficiency and increasing wasteful consumption of reagent. Moreover, the air or gas bubbles affect the compressibility of the fluid which can complicate the operational dynamics of the dispense and aspirate/dispense functions.

While some of these bubble generation problems can be controlled or mitigated by adding surfactants or various other chemical additives to modify the surface tension and/or other fluid and flow characteristics of the reagent, compatible chemistry is not available for all reagents. Also the use of surfactants and other chemicals can often lead to other problems in the dispensing apparatus, and its operation and application. Thus, there is a major reliability problem with many conventional solenoid valve dispensers that needs to be addressed.

Moreover, in most such valves as the Lee valve, the solenoid actuator is sealed inside the fluid containing housing. In many cases, the fluid is forced to flow in a passage between the solenoid actuator and the inner housing wall. This, undesirably, renders the fluid in the passage to be proximate to the electromagnetic coil of the solenoid actuator. Since the energizing of the solenoid coil can generate significant heat, the nearby fluid can experience substantial temperature rises. These temperature changes can further accentuate the bubble generation problem, and also lead to fluid degradation.

Additionally, the tortuous fluid path through conventional solenoid valves causes fluid mixing and entrapment of dead volumes of fluid. This dead volume entrapment can be particularly severe in the passage between the solenoid actuator and the inner housing wall. Undesirably, this fluid mixing and entrapment can lead to fluid degradation, contamination and dilution problems in dispense and aspirate/dispense operations, thereby, requiring additional fluid movements through the valve to flush out degraded fluid and/or contaminants.

Also, the unibody construction of typical actuator and valve elements limits the adaptability of the dispense system because the actuator is permanently incorporated with a particularly configured valve element and can only be used with that particularly configured valve element. Undesirably, this unibody construction complicates repair, maintenance and replacement of the valve and, hence, undesirably adds to the cost of the system.

Another problem associated with conventional solenoid valves is that many of the different materials that they are fabricated from are exposed to fluid and may be susceptible to chemical attack by some solvents. Disadvantageously, this can not only cause valve malfunction but can also lead to fluid contamination. Thus, it would be desirable to have a versatile valve which is fabricated from materials that are chemically inert to a wide variety of solvents.

Also, process efficiency can be greatly enhanced by running assays in high-density microplates, such as 384-well, 864-well, 1526-well and greater microplates, by providing dimensionally small valves. Assay miniaturization can be a very important and desirable aspect, for example, in high density applications such as genomic research, drug discovery and other applications. But, it is difficult using conventional construction methods to fabricate a typical solenoid dispenser having a diameter less than about 7 to 8 mm.

Moreover, in many applications more than one dispense or aspirate/dispense line is required to achieve high speed parallel processing. For example, 8-channels or 96-channels are commonly used in microtiter plate type applications to improve process throughput. In such situations valve costs per line can be very high which can preclude their use in high-density applications. Thus, it would be desirable to provide not only miniaturized valves but also valves that can be manufactured at a reasonably low cost.

Other desirable aspects of a valve for a dispensing system include a wide operating range, low power requirement, quick setup/priming, ease of hooking up and high operational safety.

SUMMARY OF THE INVENTION

A reagent dispensing valve constructed in accordance with one preferred embodiment of the present invention overcomes some or all of the aforementioned disadvantages by incorporating separate valve and actuator portions that substantially minimize localized fluid pressure drops and, desirably, minimizes fluid entrapment and mixing.

The valve portion, preferably, includes a plunger and a seat which are disposed in a valve cavity to define a valve orifice opening. The plunger and valve are configured to minimize the pressure drop through the valve orifice opening, thereby, advantageously, discouraging bubble formation. The plunger is adapted to seal against the seat to block the valve orifice opening when the valve is in the closed position. Preferably, the plunger is substantially blunt faced and the seat is substantially rounded. In other preferred embodiments of the present invention, the plunger may be substantially wedge faced or substantially spherically faced, though other plunger shapes may be used with efficacy, and the seat may be beveled or flat, though other seat shapes may be used with efficacy. Preferably, the plunger has a resilient exterior that can sealingly engage the seat. Preferably, the valve cavity is generally tapered in the direction of the seat, thereby, advantageously, discouraging bubble accumulation Preferably, the valve cavity is configured to optimally minimize its volume, and hence reduce the possibility of fluid entrapment sites or "dead spots" forming in the valve cavity. Preferably, the fluid flows into the valve cavity through a concentric feed which desirably further discourages "dead spots" of fluid to form in the valve cavity.

In one preferred embodiment of the present invention, the actuator is a solenoid actuator. The solenoid actuator is adapted to open and close the valve at a predetermined frequency and duty cycle by displacing the plunger. Preferably, the plunger is in mechanical communication with a movable core, which is spring biased in the direction of the seat, of the actuator. The actuator is substantially sealingly engaged with the valve portion via a resilient diaphragm which isolates the actuator from the fluid in the valve portion. Additionally, the fluid path through the valve is substantially decoupled from the solenoid actuator and the fluid enters the valve through a substantially cylindrical cavity in a fitting of the actuator, thereby, protecting the fluid from undesirable heating and other deleterious effects. In one preferred embodiment of the invention, the plunger is molded into the diaphragm. Preferably, the valve portion is removably attachable from the solenoid actuator. Desirably, this separation of function adds to the adaptability and modularity of the valve of the present invention.

In one preferred embodiment of the present invention, the valve includes an optional bubble trap. Preferably, the bubble trap is in fluid communication with the valve cavity via the concentric feed and the cylindrical cavity of the actuator fitting. The bubble trap is disposed adjacent to the cavity of the actuator fitting and also has a cavity which is spaced from and disposed generally above the valve cavity. Preferably, the bubble trap cavity is dimensioned to be substantially larger than the actuator fitting cavity. Advantageously, the positioning and dimensioning of the bubble trap cavity encourages gaseous bubbles that are formed in the valve to buoyantly rise into the bubble trap, thereby avoiding valve malfunction. Preferably, the bubble trap can purge the fluid containing bubbles into a sump.

The valve of the present invention in combination with a positive displacement pump, a fluid reservoir, a tip and a nozzle can dispense precise quantities of fluid and can aspirate a source fluid, while advantageously minimizing bubble formation and accumulation in the valve. The valve can be used to form droplets in the range from about 100 picoliters (pL) to about 10 nanoliters (nL) or more.

Those of ordinary skill in the art will readily recognize the versatility of the present invention and the benefits it presents over conventional prior art reagent dispensing valves. The construction of the valve permits desirable adaptability and minimizes undesirable gaseous bubble precipitation and accumulation within the fluid in the valve. In one preferred embodiment the valve also provides means to efficiently remove these bubbles from the valve.

Other specific provisions and advantages of the present invention will become apparent from a reading and study of the specification, claims and figures. As will be realized by those skilled in the art the invention is capable of modifications in various respects, all without departing from the scope and utility of the invention as disclosed herein. Accordingly the specification and figures should be regarded as illustrative in nature, and not as restrictive.

BRIEF DESCRIPTION OF THE DRAWINGS

FIG. 11A is a schematic illustration of the "blunt" plunger of FIG. 4A;

FIG. 11B is a schematic illustration of a "wedge" plunger in accordance with one preferred embodiment of the present invention;

FIG. 11C is a schematic illustration of a "sphere" plunger in accordance with one preferred embodiment of the present invention;

FIG. 12A is a schematic illustration of the "fillet" seat of FIG. 4A;

FIG. 12B is a schematic illustration of a "bevel" seat in accordance with one preferred embodiment of the present invention;

FIG. 12C is a schematic illustration of a "flat" seat in accordance with one preferred embodiment of the present invention;

FIG. 13A is a bottom plan view of the plunger of FIG. 11A;

FIG. 13B is a bottom plan view of the plunger of FIG. 11B;

FIG. 13C is a bottom plan view of the plunger of FIG. 11C;

DETAILED DESCRIPTION OF THE PREFERRED EMBODIMENTS

Figure 1:
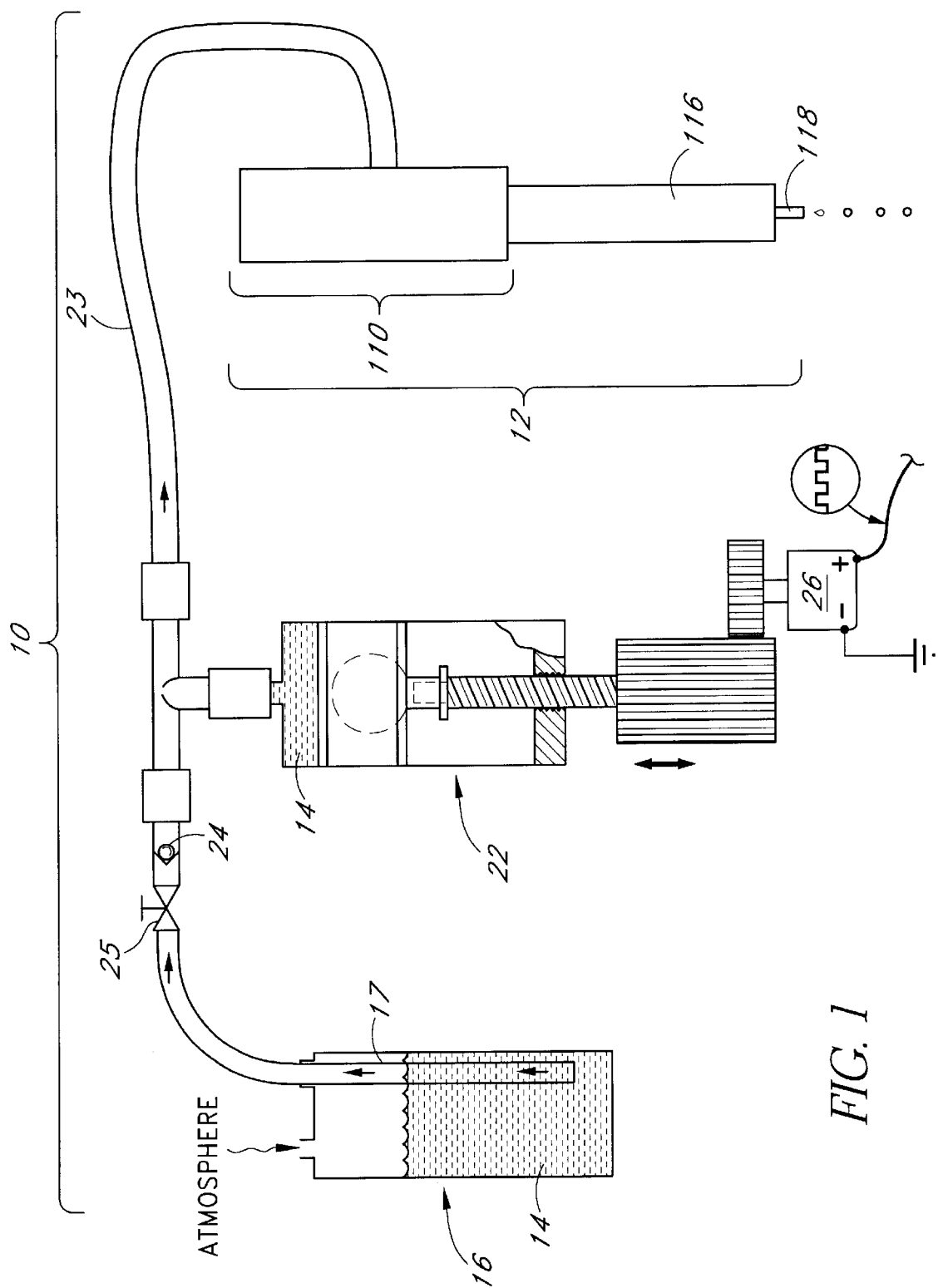
FIG. 1 is a simplified schematic illustration of a microfluidic dispensing apparatus for dispensing or aspirating precise quantities of liquid.

FIG. 1 is a schematic drawing of a microfluidic dispensing apparatus 10. The dispensing apparatus 10 generally comprises a dispenser 12 for dispensing reagent 14 from a reservoir 16 and a positive displacement syringe pump 22 intermediate the reservoir 16 and the dispenser 12 for precisely metering the volume and/or flow rate of reagent dispensed. The dispenser 12 is selectively operated to provide individual droplets or a spray pattern of reagent, as desired, at the predetermined incremental quantity or metered flow rate. Of course, the dispenser 12 may also be operated in an aspirate mode to "suck" precise quantities of reagent or other liquids from a sample or reservoir.

Referring to FIG. 1, the pump 22 is preferably a high-resolution, positive displacement generator hydraulically coupled to the dispenser 12. The hydraulic coupling provides for the situation where input from the pump 22 equals the output from the dispenser 12 under steady state conditions. Therefore, the positive displacement system uniquely determines the output volume while the operating dynamics of the dispenser 12 serves to transform the output volume into an ejected drop or drops. The positive displacement pump 22 may be any one of several varieties of commercially available pumping devices for metering precise quantities of liquid. A syringe-type pump 22, as shown in FIG. 1, is preferred because of its convenience and commercial availability. A wide variety of other pumps may be used, however, to achieve the benefits and advantages as disclosed herein. These may include, without limitation, rotary pumps, peristaltic pumps, squash-plate pumps, and the like.

The dispenser 12 typically includes a solenoid-actuated reagent dispensing valve 110 coupled to a tip 116 which ends in a nozzle 118, as schematically illustrated in FIG. 1. As noted above, such dispensers are available from The Lee Company of Westbrook, Conn. A detailed description of such a dispenser can be found in U.S. Pat. No. 5,743,960, incorporated herein by reference.

Figure 2:
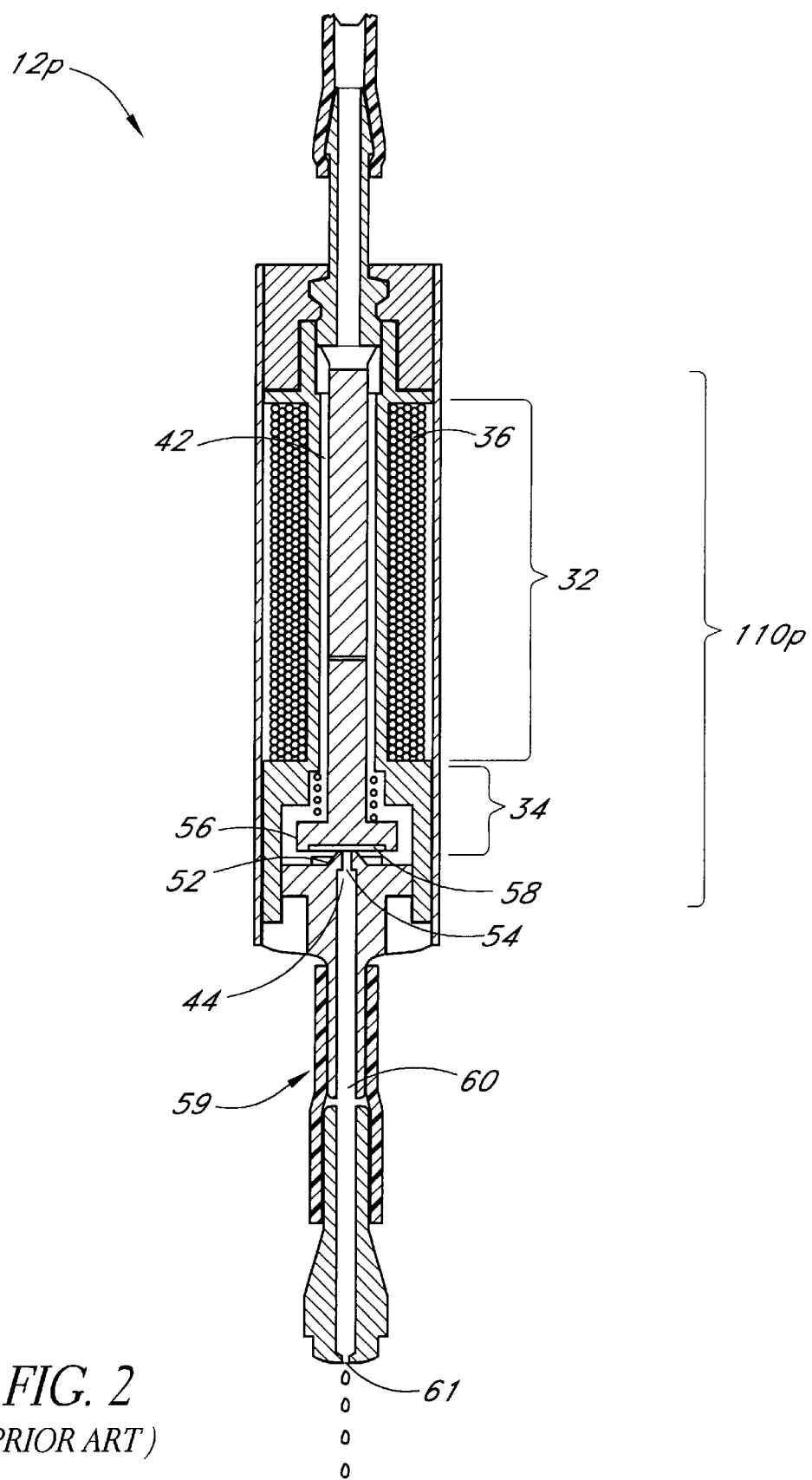
FIG. 2 is a cross-sectional view of a typical solenoid valve dispenser as known in the prior art.

Referring to FIG. 2, it can be seen that the typical solenoid-actuated valve 110p includes a solenoid portion (actuator) 32 and a valve portion 34 with these two portions being integrated to form a unitary solenoid-actuated valve 110p. Disadvantageously, this unibody construction and intrinsic coupling of the solenoid actuator 32 and the valve portion 34 limits the adaptability of the prior art dispenser 12p, wherein the solenoid actuator 32 and the valve portion 34 can only be utilized with one another. This constraint on the use of the dispenser 12p and the valve 110p also complicates repair, replacement of the dispenser 12p and the valve 110p, thereby undesirably adding to the cost of the system.

Typically, in a conventional solenoid valve 110p such as shown in FIG. 2, the reagent or liquid to be dispensed flows through an annular passage 42 which is substantially in close proximity to and substantially enveloped by an electromagnetic coil 36. Typically, to energize the electromagnetic coil 36 of the solenoid valve 110p requires a power input of about 5 Watts. Those skilled in the art will readily recognize that the design of the prior art Lee valve 110p undesirably exposes the fluid in the annular passage 42 to heat generated by the energizing of the electromagnetic coil 36. This undesirable temperature rise not only degrades the fluid quality and can adversely affect the quality of the end-result of the dispensing operation, but also accentuates the formation of air/gas bubbles in solution from dissolved air/gas in the reagent or liquid to be dispensed. Some disadvantages of these air/gas bubbles have been discussed before, and will further be discussed later herein.

The conventional valve 110p shown in FIG. 2, also undesirably presents a tortuous path for the reagent or liquid flow in that the fluid follows a meandering circuitous fluid journey around the sharp edges of the stopper 56, through the constricting gap between the valve face 58 and the valve seat 52, and into the valve orifice opening 54. This generates significant pressure drops which result in air/gas bubble precipitation. These bubbles can accumulate in the valve portion 34 and result in clogging of the dispenser 12p. Buoyancy forces may also cause the bubbles to rise and collect in the annular passage, thereby further accentuating the clogging problem. Additionally, the bubbles may collect in the upper portion 44 of the tip 59 partially due to buoyancy effects, partially due to the rapid diameter transition between the valve orifice opening 54 and the tip 59, and partially due to the possible formation of a semi-stagnant fluid region in the tip upper portion 44.

Figure 3:
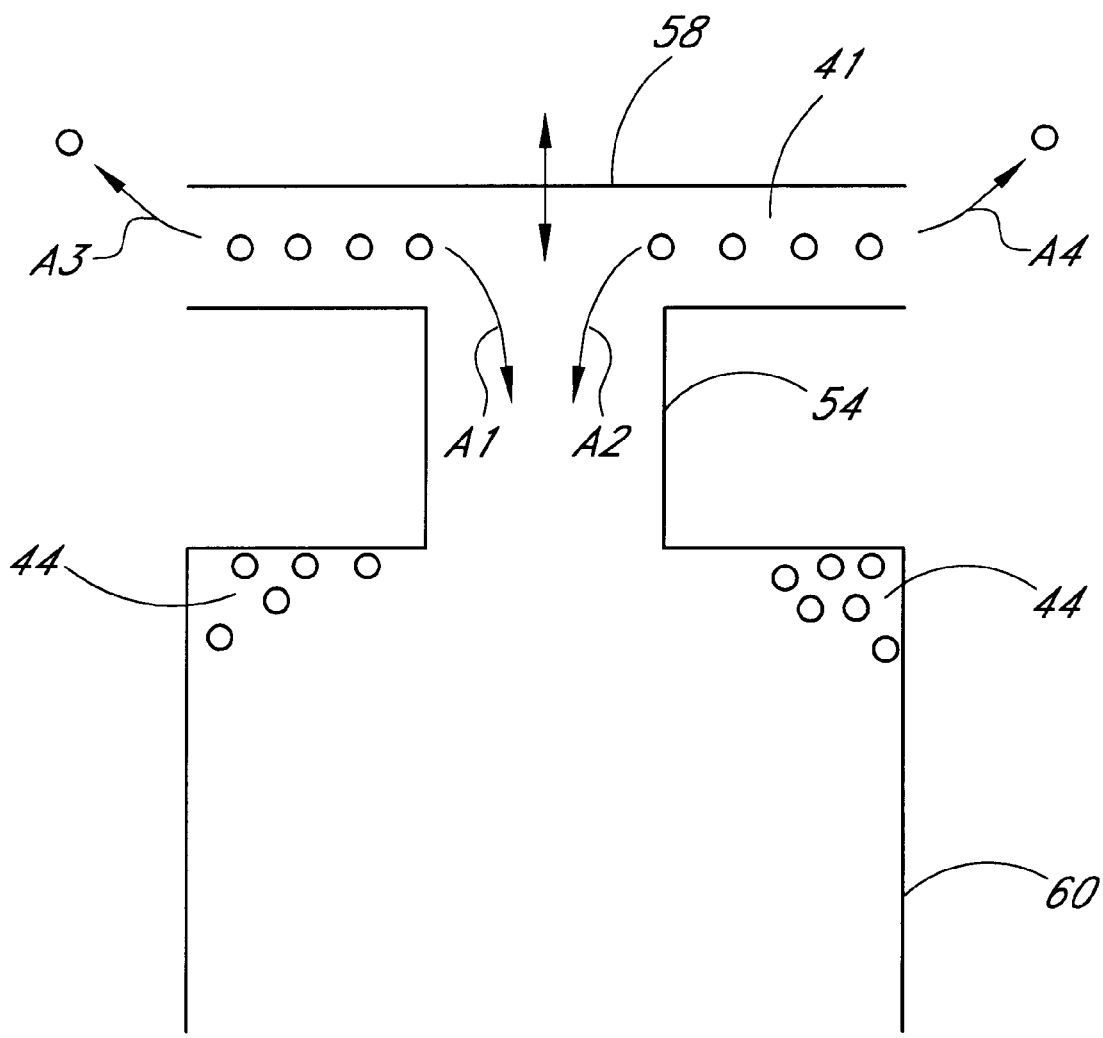
FIG. 3 is a schematic representation of bubble passage through the valve of FIG. 2.

The bubble precipitation problem in conventional solenoid valve dispensers, such as the prior art solenoid valve dispenser 12p which incorporates the valve 110p, as shown in FIG. 2, is best exemplified by the schematic illustration of FIG. 3. When the valve 110p is open, as illustrated in FIG. 3, the significant pressure difference due to the higher pressure upstream of the valve face 58 and the lower pressure in the tip cavity 60 in combination with the local pressure gradients due to the tortuous fluid path renders the gap 41 vulnerable to bubble formation. During droplet dispensing some of these bubbles formed in the gap 41 may flow through the valve orifice opening 54, as indicated in FIG. 3 by the arrows A1 and A2, into the tip cavity 60 and some of these bubbles may eventually be ejected from the nozzle 61 (see FIG. 2) while some of them may collect in the tip upper portion 44. Similarly, as the valve 110p is closed, that is, as the valve face 58 moves downwards and closes the gap 41, some of these bubbles formed in the gap 41 may flow through the valve orifice opening 54, as indicated in FIG. 3 by the arrows A1 and A2, into the tip cavity 60 and some of these bubbles may eventually be ejected from the nozzle 61 (see FIG. 2) while some of them may collect in the tip upper portion 44. On the other hand, as the valve 110p is closed some of the bubbles formed in the gap 41 may be forced upwards, as indicated by the arrows A3 and A4 in FIG. 3, and collect around the stopper 56 and in the annular passage 42.

Those skilled in the art will readily comprehend that the bubble formation and collection problems associated with conventional dispensers such as the solenoid valve dispenser of 12p, shown in FIG. 2, are directly related to the structure and geometry of the valve 110p. The collection of air/gas bubbles within the valve 110p also affects the bulk compressibility of the reagent or liquid and this can complicate the operational dynamics of the dispense and aspirate/dispense functions, particularly at high frequencies, thereby potentially resulting in unpredictable and unreliable dispenser performance. Additionally, the tortuous fluid path through conventional solenoid valves 110p, such as shown in FIG. 2, causes fluid mixing and entrapment of dead volumes of fluid. Undesirably this can lead to fluid degradation, contamination and dilution problems in dispense and aspirate/dispense operations requiring fluid movement through the valve 110p.

To remedy the clogging of a dispensing apparatus typically involves purging the fluid into a waste receptacle by usually performing a high speed continuous dispense operation. Of course, frequent clogging will require frequent purges, thereby, disadvantageously, reducing process efficiency and increasing wasteful consumption of reagent or liquid. This problem can be particularly severe during aspiration. For example, if a purge has to be performed after a substantially large volume of fluid has been aspirated and which is mostly still resident within the dispensing apparatus, then performing a purge not only wastes the aspirated fluid but also requires the aspirate operation to be repeated to recover the lost fluid. Of course, it would be desirable to minimize wastage of the aspirated fluid and the necessity to repeat the aspirate operation, as is realized in one preferred embodiment of the present invention to be discussed in greater length later herein.

Isolated Valve and Actuator Design

One unique and significant feature of the preferred valve dispenser of the present invention is that its two main components, namely, the valve portion and the actuator, are autonomous elements being preferably isolated from one another, as will be described in greater detail later herein. The actuator provides the impulsive force to the fluid while the valve portion serves as a flow restricter and timer to control the size and frequency of droplet formation. Advantageously, this separation of functions shortens the fluid path and also provides modularity and adaptability for a wide range of aspirate/dispense applications and facilitates technical solutions for numerous aspirate/dispense situations.

Those skilled in the art will readily appreciate that a wide variety of valve/actuator combinations, wherein the valve and actuator are independent elements, may be used to achieve the benefits and advantages taught herein. The following description illustrates some preferred embodiments of the reagent dispensing valve in accordance with the present invention.

Figure 4A:
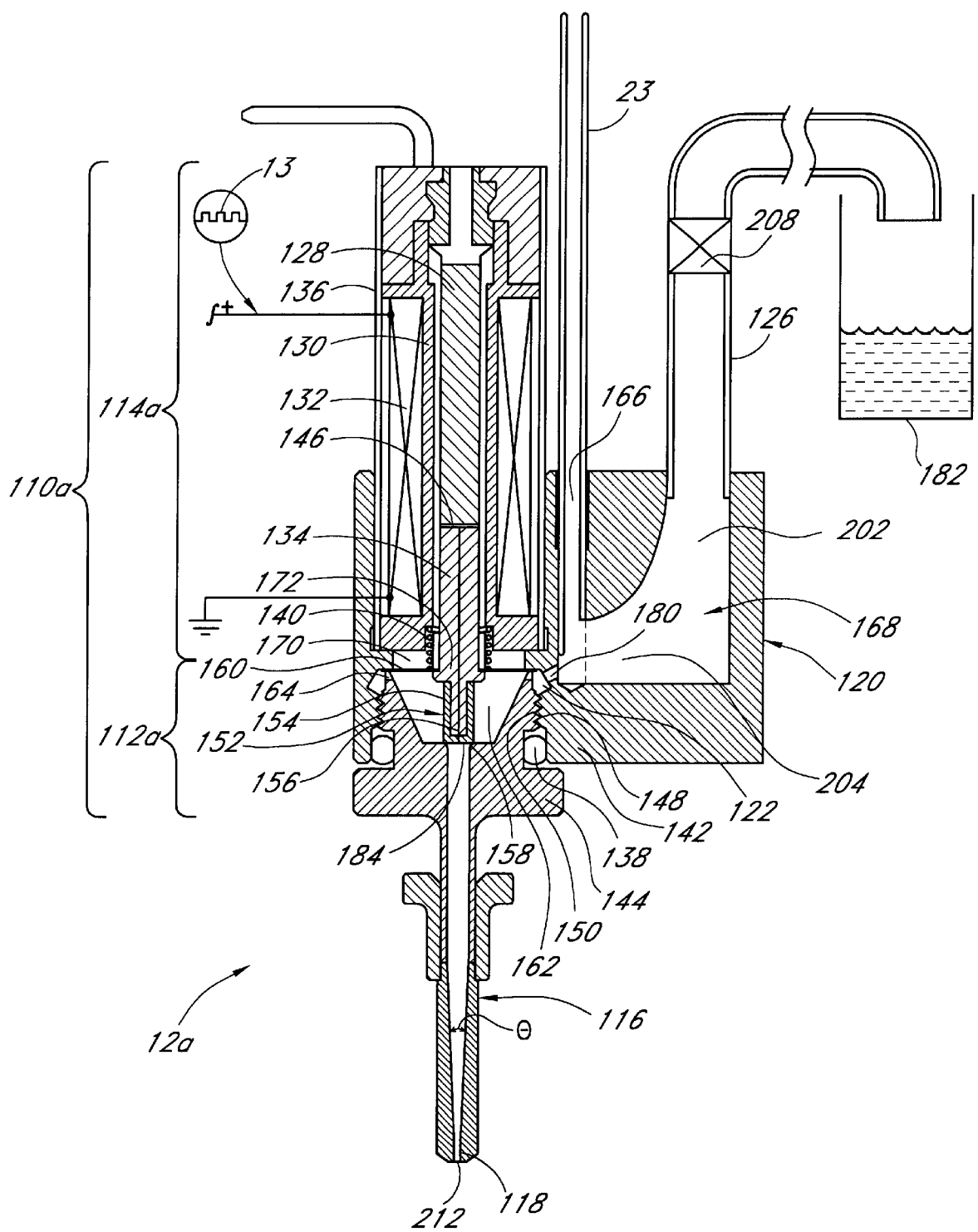
FIG. 4A is a cross-sectional view of a solenoid valve dispenser having features in accordance with one preferred embodiment of the present invention.
Figure 4B:
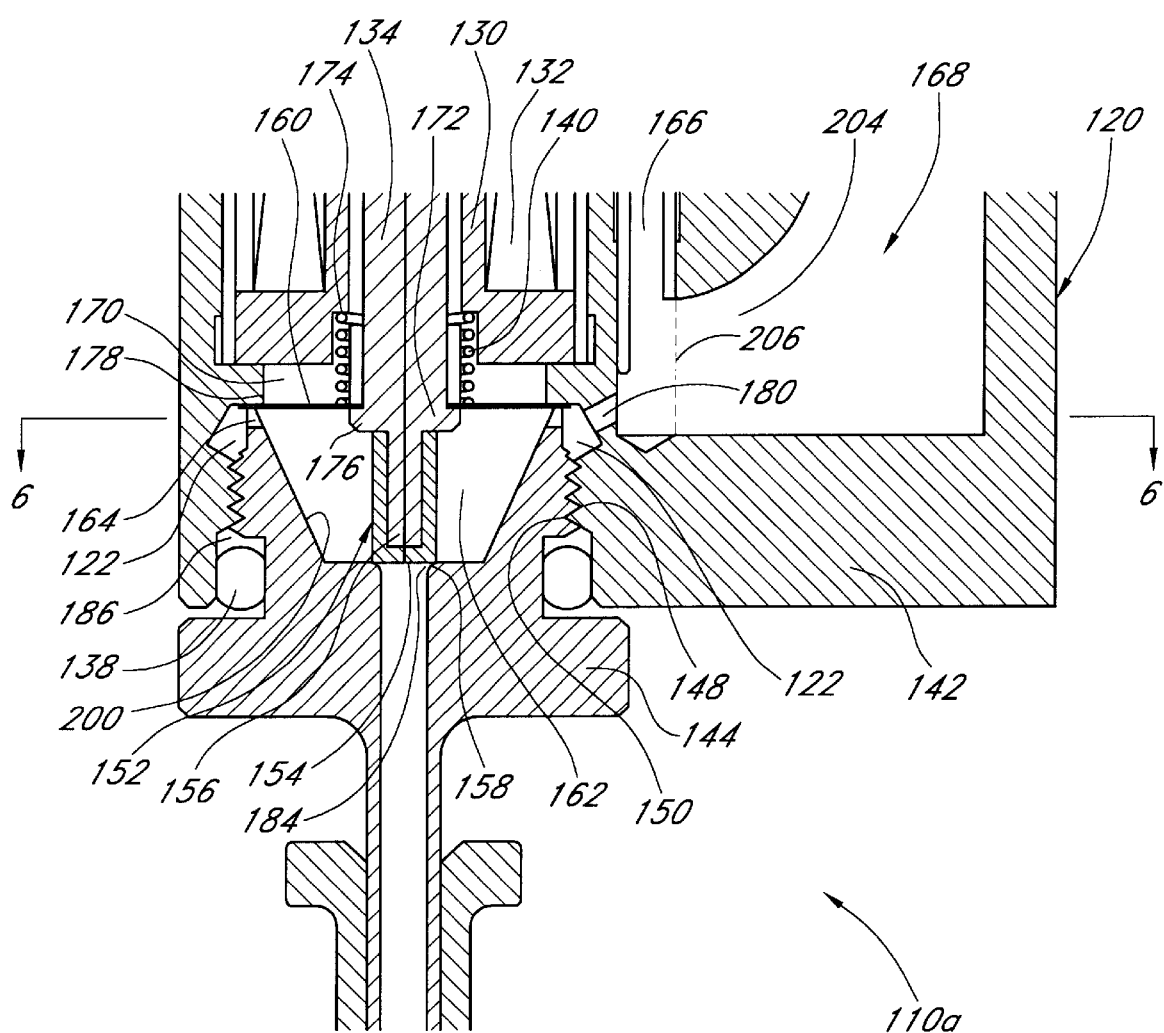
FIG. 4B is a cross-sectional detail view of the valve portion of FIG. 4A.

FIG. 4A is a cross-sectional view illustrating a preferred solenoid valve dispenser 12a incorporating a reagent dispensing valve 110a constructed and assembled in accordance with one preferred embodiment of the present invention. FIG. 4B is an enlarged cross-sectional view illustrating the valve 110a. Preferably, the valve 110a comprises a plunger/seat type valve portion 112a and a solenoid actuator 114a which are sealingly interfaced with one another via means of a diaphragm 160.

Preferably, the solenoid actuator 114a includes an electromagnetic coil or winding 132, a static core 128 and a movable core 134 which are contained in a substantially cylindrical housing 136, as best seen in FIGS. 4A and 4B. The static core 128 and movable core 134 are disposed within a hollow cylindrical sleeve 130 and are preferably spaced at least slightly away from the inner walls of the sleeve 130. The static core 128 and movable core 134 are preferably formed of a ferrous or magnetic material, such as 430 stainless steel, iron or the like.

Preferably, the housing 136 is fabricated from a magnetic material such as 430 stainless steel to close the magnetic field within the solenoid actuator 114a, though alternate materials, including metals, alloys, plastics and ceramics among others, may be used with efficacy. The sleeve 130 is preferably fabricated from LCP (liquid crystal polymer) coil bobbin though alternate materials, including metals, alloys, plastics and ceramics among others, may be used with efficacy.

Referring to FIGS. 4A and 4B, the solenoid actuator 114a is preferably mounted in an actuator fitting 142 which has threads 148 that permit attachment of the actuator 114a to the valve portion 112a. A cavity 170 formed at the distal end 172 of the movable core 134 preferably houses a coil spring 140 which provides a spring bias that separates the static core 128 and movable core 134 by a small gap 146, and renders the valve 110a "closed" in its rest state. Preferably, the coil spring 140 envelops the distal end 172 of the movable core 134 and is situated between the lower surface of a step 174 of the sleeve 130 and the upper surface of a step 176 of the movable core 134, as best seen in FIG. 4B. Those skilled in the art will appreciate that when the solenoid coil 132 is energized a magnetic field is created which draws the movable core 134 upward toward the static core 128, thereby compressing the coil spring 140, closing the gap 146 and "opening" the valve 110a, as will be discussed further later herein. Of course, during this upward motion of the movable core 134 the diaphragm 160 will also be flexed upwards. The solenoid valve may be energized by one or more electrical pulses 13 provided by a pulse generator (not shown).

Preferably, the coil spring 140 is fabricated from 302 or 316 stainless steel though alternate, preferably nonmagnetic, materials such as other suitable types of alloys and metals among others, may be used with efficacy. Those of ordinary skill in the art will readily comprehend that alternate suitable resilient durable means such as other types of springs or, for example, a sleeve fabricated from rubber, Teflon®, Kevlar and the like, may be utilized instead of the coil spring 140.

Preferably, the diaphragm 160, shown in FIGS. 4A and 4B, is substantially annular in shape and is sealingly interfaced with the upper surface of the step 176 of the movable core 134 and the lower surface of a step 178 formed in the actuator fitting 142. The actuator fitting 142, preferably, includes a substantially cylindrical main feedline cavity 166 spaced from the actuator 114a, as can be seen in FIGS. 4A and 4B. The tubing 23, also shown in FIG. 1, leads into the main feedline cavity 166. Preferably, the actuator fitting 142 also includes another cylindrical cavity 180 in communication with the main feedline cavity 166 and with a groove forming a concentric feed 122 which is located adjacent to the threads 148 of the actuator fitting 142. The advantages of such a concentric feed 122 will become evident later herein.

Figure 5:
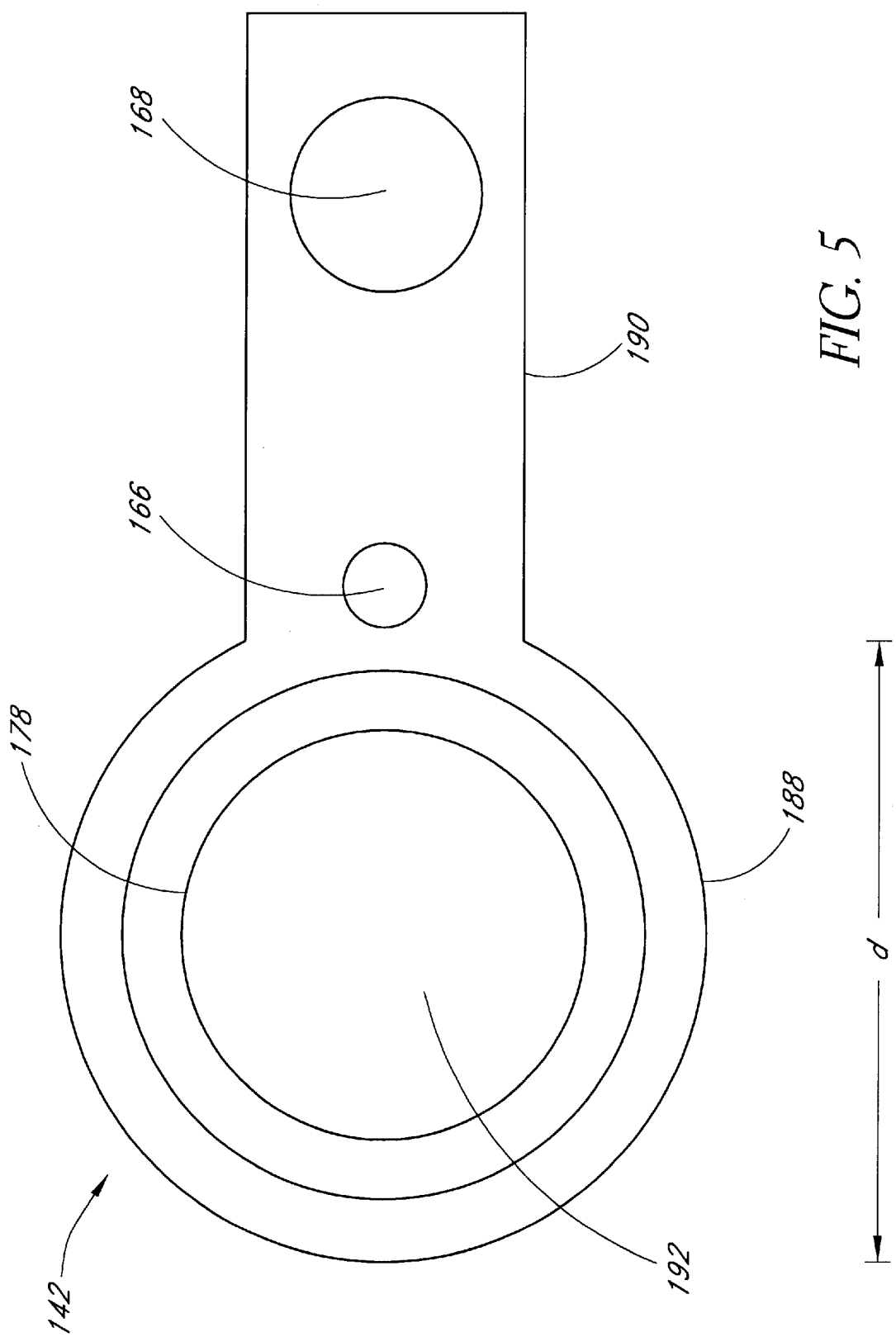
FIG. 5 is a top plan view of the actuator fitting of FIG. 4A.

The general shape of one preferred actuator fitting 142 is schematically further illustrated by a top plan view shown in FIG. 5. The actuator fitting 142 has a substantially cylindrical portion 188 with a substantially cylindrical cavity 192 with the step 178 (also shown in FIGS. 4A and 4B) on which the actuator 114a rests. The actuator fitting 142 also has a protruding portion 190 which includes the main feedline cavity 166, and in one preferred embodiment a bubble trap cavity 168, as will be discussed in greater detail later herein.

Figure 9:
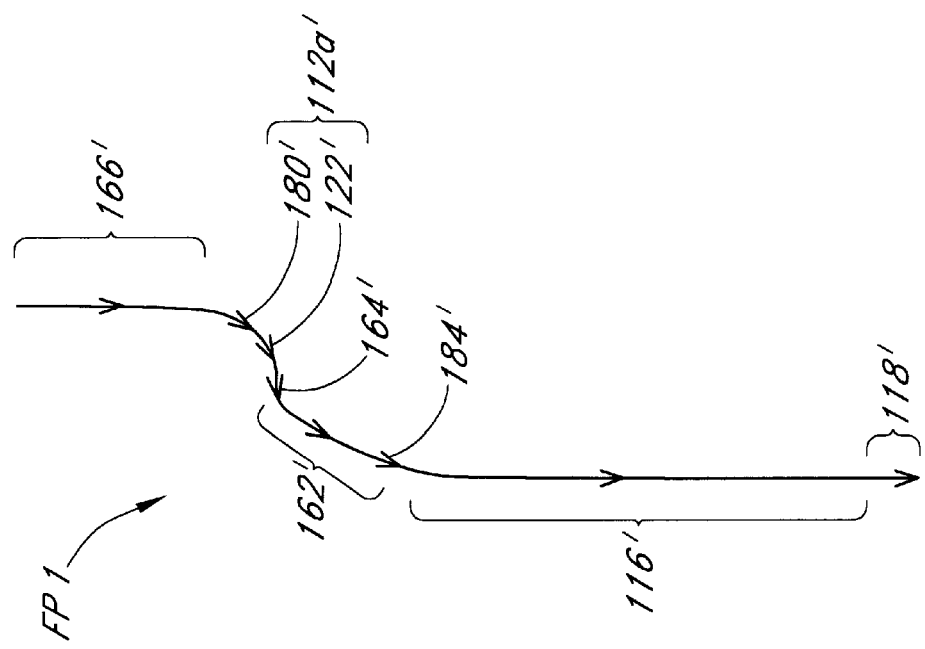
FIG. 9 is a schematic representation of the fluid path through the valve of FIG. 4A.

Referring to FIGS. 4A and 4B, the valve portion 112a preferably comprises a valve seat 158, having a valve orifice opening 184, and a plunger 152 adapted to seal against the valve seat 158. Preferably, the plunger 152 comprises an inner core 156 and an outer cover 154. Preferably, the inner core 156 is in mechanical communication with the distal end 172 of the movable core 134 and is spring biased toward the valve seat 52 via coil spring 60 so that, in the closed position of the valve 10a, the cover 154 is sealingly engaged with the valve seat 158. In one preferred embodiment of the present invention, shown in FIGS. 4A and 4B, the engaging surfaces of the plunger 152 and valve seat 158 are substantially blunt and substantially rounded (fillet), respectively, though other preferred embodiments may have different configurations as illustrated in FIG. 9 and which will be discussed at greater length later herein.

Preferably, and as shown in FIGS. 4A and 4B, the valve portion 112a further includes a valve body 144 disposed with threads 150 to engage the threads 148 of the actuator fitting 142. This engagement of the valve body 144 with the actuator fitting 142 preferably creates a valve cavity 162 which is preferably tapered, with a tapered side wall 200, and a concentric gap 164 between the valve body 144 and the diaphragm 160. Preferably, an O-ring 138, preferably fabricated from EPDM rubber or the like, disposed in a gap 186 proximate to the valve body threads 150 and the actuator fitting threads 148 assists in preserving the fluid integrity of the liquid or reagent in the valve cavity 162. In one preferred embodiment of the present invention, the valve portion 112a is welded to the actuator fitting 142 to create the valve cavity 162 and the concentric gap 164. Alternatively, the valve portion 112a and the actuator fitting 142 may be attached by other means, such as screws, pins, adhesives and the like, or they may be formed as an integral unit, as required or desired.

Figure 6:
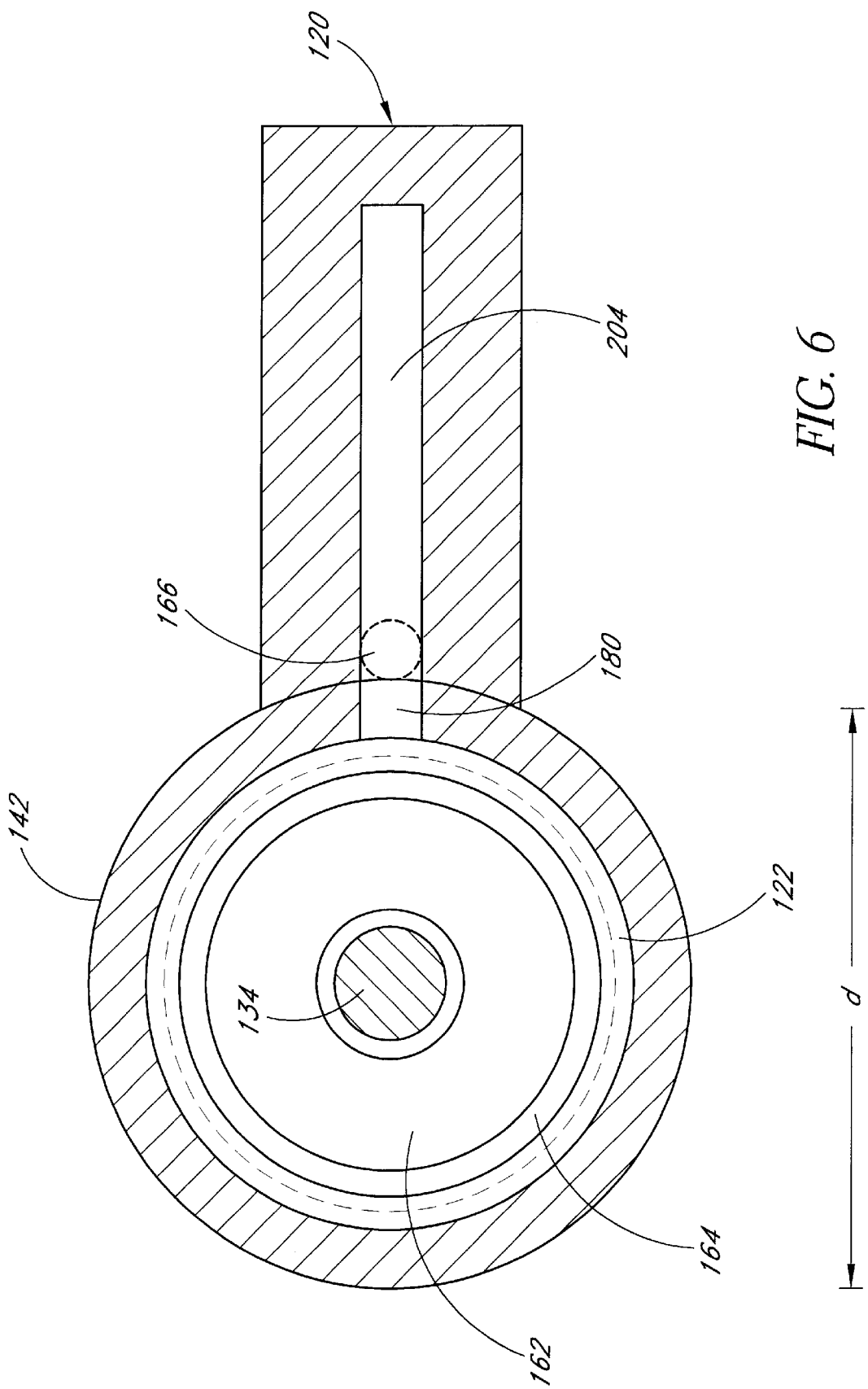
FIG. 6 is a sectional view, taken along line 6—6 of FIG. 4B.

Referring to FIGS. 4A and 4B, preferably, the concentric gap 164 and the concentric feed 122 are in communication, thereby allowing fluid from the feedline 23 to flow through the main feedline cavity 166, the actuator fitting cavity 180, the concentric feed 122, the concentric gap 164 and into the valve cavity 162 as is well illustrated by FIG. 6. The diaphragm 160 also prevents any reagent or liquid from leaking into the actuator portion cavity 170.

Again, those skilled in the art will readily appreciate that as the actuator movable core 134 moves up and down, the plunger 152 will alternatingly disengage and engage with the valve seat 158, thus opening and closing the valve 110a, accordingly (FIGS. 4A and 4B). Moreover, each time the valve 110a opens and closes, a volume of liquid is forced through the valve orifice opening 184 to form a pulse or pressure acoustic wave which ejects a droplet of liquid from the nozzle 118.

Since the diaphragm 160, the plunger outer cover 154, the step 176 of the movable core 134 and portions of the actuator fitting 142 and valve body 144 are exposed to reagent or liquid it is preferred that these components be fabricated from inert and/or corrosion resistant materials. It is also preferred that the diaphragm 160 and plunger outer cover 154 be fabricated from a resilient and durable material.

Preferably, the diaphragm 160 is fabricated from Teflon® though other compatible materials such as stainless steel, Kevlar and the like may be utilized with efficacy. Similarly, the plunger outer cover 154 is preferably fabricated from Teflon® though other suitably compatible materials such as Kevlar and the like may also be utilized with efficacy.

The actuator fitting 142 and the valve body 144 are preferably fabricated from 303 stainless steel though alternate compatible materials such as metals, alloys, plastics and ceramics among others, may also be utilized with efficacy, giving due consideration to the desired goal of providing adequate containment of fluid and resistance to chemical attack. As mentioned before, the movable core 134, including the step 176, is preferably fabricated from 430 stainless steel which advantageously has desirable anti-corrosion properties.

Figure 4C:
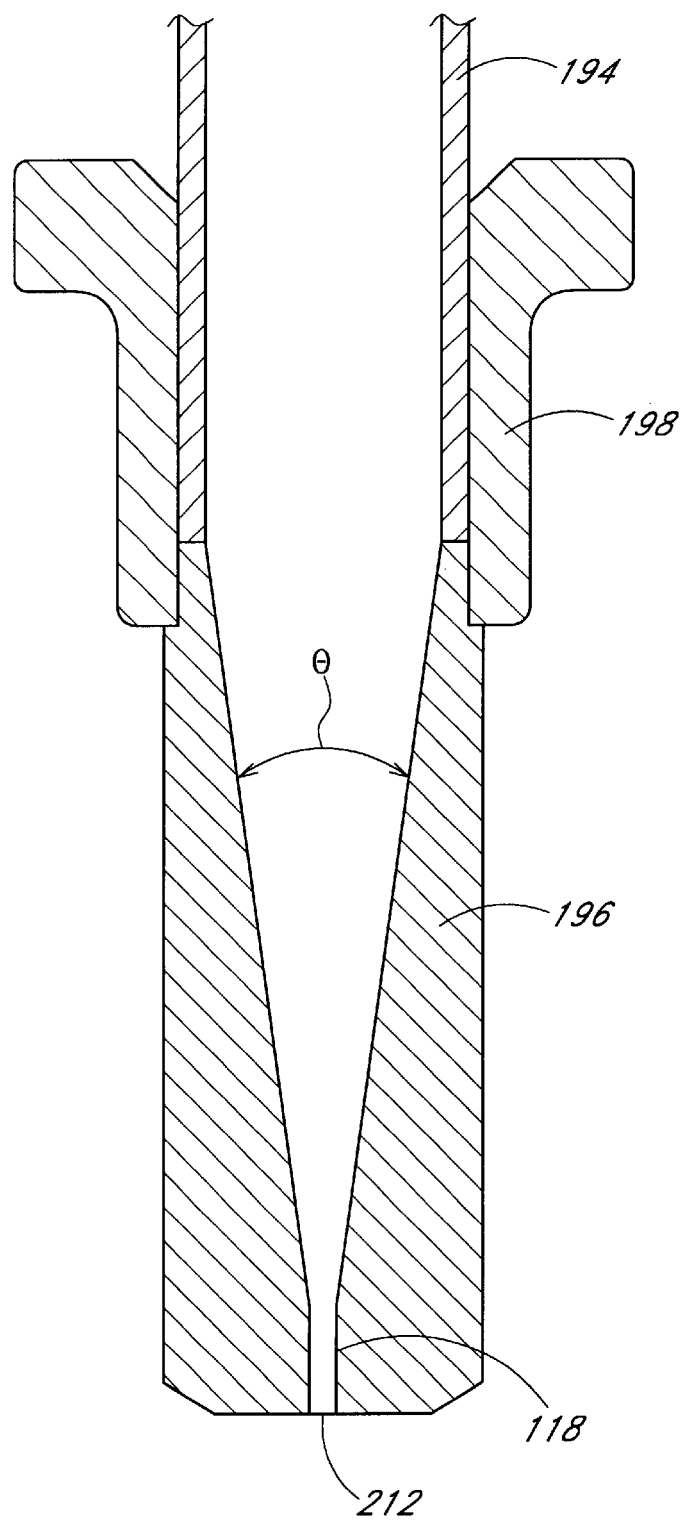
FIG. 4C is a cross-sectional detail view of the tip and nozzle of FIG. 4A.

One preferred embodiment of the tip 116 and nozzle 118 which are incorporated into the dispenser 12 (FIG. 1), 12a is illustrated in FIGS. 4A and 4C. Preferably, the tip 116 comprises an upper portion 194 coupled to a lower portion 196 by means of a fitting 198. The tip upper portion 194 may be detachable from the valve body 144 or, alternatively, may be molded into the valve body 144 as shown in FIGS. 4A and 4C. Preferably, the tip lower portion 196 is tapered and terminates in the nozzle 118. This tapering of the tip lower portion 196 provides a smooth flow transition between the tip upper portion 194, the tip lower portion 196 and the nozzle 118, thereby minimizing undesirable bubble formation and accumulation, and the likelihood of local flow turbulence. Preferably, the tip lower portion 196 is detachable from the tip upper portion 194 which advantageously permits adaptability in nozzle selection as needed or desired. Preferably, the tip lower portion and nozzle are fabricated from polypropylene though other thermoplastics such as polyethylene or other materials, for example, suitable metals, alloys and ceramics among others, which have desirable anti-corrosion properties may be utilized with efficacy.

In one preferred embodiment, the present invention includes a bubble trap 120 disposed in the actuator fitting 142 and adjacent to the main feedline cavity 166, as can be seen in FIGS. 4A and 4B. Preferably, the bubble trap 120 comprises a cavity 168 which is in communication with the main feedline cavity 166. The bubble trap cavity 168 is connected to tubing 126 which preferably leads to a sump 182 via a valve 208; optionally, the tubing 126 may lead to the reservoir 16 (shown in FIG. 1). Preferably, the bubble trap cavity 168 comprises a combination of two generally tapered cavities 202 and 204. Preferably, the volume of the bubble trap cavity 168 is substantially larger than the volume of the main feedline cavity 166. Also, it is preferable that the minimum diameter of the bubble trap cavity 168 is larger than the diameter of the main feedline cavity 166. This ensures that the diameter at the junction 206 between the lower bubble trap cavity 204 and the main feedline cavity 166 is larger than the diameter of the main feedline cavity 166. Similarly, it is preferable that the bubble trap tubing 126 has a larger internal diameter than that of the main feedline tubing 23. The reasons for such a preferred structure for the bubble trap 120 and the details of the operational dynamics of the bubble trap 120 will be discussed later herein.

The reagent dispensing valve 110a and the other associated components of the solenoid valve dispenser 12a, as seen in FIGS. 4A, 4B and 4C, may be dimensioned in various ways depending on the particular aspirate/dispense application and requirements. By way of illustration only, the following dimensions were selected to optimally dispense a 1 nanoliter (nominal target volume) drop of water (density=1000 kg/m$^3$, viscosity=0.001 Pa-sec, surface tension=0.072 N/m) with a valve open time of about 0.0001 sec and a flow rate, as provided by the positive displacement syringe pump 22 (FIG. 1), of about $1 \times 10^{-8}$ m$^3$/sec. Preferably, the area of the valve orifice opening 184 when the valve 110a is open is about $1.5 \times 10^{-8}$ m$^2$. The diameter of the plunger 152 is preferably at least about $1 \times 10^{-3}$ m and the length of the plunger 152 is about $2 \times 10^{31\,3}$ m. Preferably the internal diameter of the valve seat 158 is about $0.75 \times 10^{-3}$ m. The volume of the valve cavity 162 is preferably about $2 \times 10^{-8}$ m$^3$. Preferably, the displacement of the plunger is less than about $5.080 \times 10^{-5}$ m. The thickness of the concentric gap 164 is preferably about 0.127 mm (5 mils). Preferably, the thickness of the diaphragm 160 is about 0.025 mm (1 mil).

Referring to FIG. 4A, the overall length of the valve 110a is preferably less than about 10 cm. Preferably, the diameter d of the valve 110a, as illustrated in FIGS. 5 and 6, is less than about 9 mm.

Preferably, the tip 116, as shown in FIGS. 4A and 4C, has an internal volume of about 20 microliters ($\mu$L) and a length of about 0.03 m. The internal diameter of the tip upper portion 194 is preferably 0.001 m. Preferably, the included angle of transition θ, between the inner diameters of the tip upper portion 194 and the nozzle 118, is less than about 45°. The pressure drop across the tip 116, at the operating conditions defined above, is preferably about 233 Pa.

Referring to FIGS. 4A and 4C, the nozzle 118 preferably has a length of about $1.905 \times 10^{-4}$ m and an internal diameter of about $9.088 \times 10^{-5}$ m. The pressure drop across the nozzle 118, at the operating conditions defined above, is preferably about 2326 Pa.

Referring to FIGS. 4A and 4C, the main feedline cavity 166 preferably has a diameter of about 0.0008 m. Preferably, the actuator fitting cavity 180, which is in communication with the main feedline cavity 166 and the concentric feed 122, has a diameter of about 0.005 m. The concentric feed 122 preferably has an average annular diameter of about 0.004 m. The bubble trap cavity 168 preferably has a volume of about $1 \times 10^{-6}$ m$^3$ which is substantially larger than the volume of the main feedline cavity 166, thus making the former a more desirable site for buoyant air/gas bubbles. Preferably, the bubble trap cavity 168 has a minimum diameter of about 0.001 m and a maximum diameter of about 0.01 m. The diameter of the orifice 206 is preferably about 0.002 m. Preferably, the main feedline tubing 23 has an internal diameter of about 0.00075 m which is smaller than the preferred internal diameter of about 0.002 m of the bubble trap tubing 126.

The coil spring 140, shown in FIGS. 4A and 4B, preferably has a spring constant of about 300 N/m. The size of the gap 146 between the static core 128 and the movable core 134 is preferably the same as the displacement of the plunger 152, that is, greater than about $5.08 \times 10^{-5}$. Preferably, the power supplied to the solenoid actuator 114a is less than about 5 Watts, and more preferably is about 0.5 Watts. Preferably, the actuator 114a can provide a force of up to about 0.71 N at an acceleration of about 5000 m/s², though a higher acceleration of about $4 \times 10^{-5}$ m/s² is desirable.

The reagent dispensing valve of the present invention, such as in one preferred embodiment the solenoid valve 110a (see FIGS. 4A and 4B), provides several advantages over conventional reagent dispensing solenoid valves, for example, the Lee valve 110p of the solenoid dispenser 12p which are illustrated in FIG. 2. Advantageously, the valve 110a permits the valve portion 112a and the actuator 114a to be conveniently coupled or decoupled, as needed or desired. This is accomplished by providing a threadable connection to link the valve portion 112a with the actuator 114a via the actuator fitting female threads 142 and the valve body male threads 150. Of course, the valve portion 112a and the actuator 114a may be detachably coupled using alternate means, for example, by utilizing screws to attach the actuator fitting 142 to the valve body 144. Thus, in the event that the valve portion 112a is damaged or the actuator 114a malfunctions or the dispenser 12a needs to be used for an application requiring a differently configured valve portion or actuator, the required adjustment is easily executed without discarding or replacing the entire valve 110a. Additionally, the detachment of the valve portion 112a and actuator permit easy access to the interior of the valve portion 112a which is desirable, for example, if the valve surfaces exposed to fluid contact need to be cleaned or if a particular reagent needs to be used which requires special treatment of the valve interior surfaces. Also, the outer cover 154 of the plunger 152 is conveniently replaceable as needed or desired. In this manner, the valve 110a is configured to allow task-specific designs, thus, providing modularity on the design side. Also, the adaptability and modularity of the solenoid valve 110a facilitates its use, repair, maintenance and replacement which desirably increases operational efficiency and assists in maintaining low operational costs.

In contrast to conventional valves such as shown in FIG. 2, the reagent dispensing valve of the present invention, such as in one preferred embodiment the solenoid valve 110a (see FIGS. 4A and 4B) distinctly separates the fluid flow path from the actuator 114a, thereby rendering the actuator 114a in fluid isolation from the valve portion 112a. For the reagent dispensing valve 110a, this is accomplished by providing the diaphragm 160 substantially at the interface of the actuator 114a and the valve portion 112a, and by providing the main feedline cavity 166 in the actuator fitting 142. The main feedline cavity 166 is connected to tubing 23 which is in turn linked to the reagent supplying positive displacement pump 22. In this manner, the fluid flow path is decoupled from the actuator 114a, and thereby substantially protected from the detrimental heating effect of the electromagnetic coil 132 of the actuator 114a. Therefore, in the reagent dispensing valve of the present invention, the temperature rise problems associated with reagent or liquid degradation and air/gas bubble formation are largely circumvented.

In contrast to conventional dispensing valves, the reagent dispensing valve of the present invention, illustrated in one preferred embodiment as the valve 110a in FIGS. 4A and 4B, substantially overcomes or minimizes the undesirable effects of bubble precipitation and collection. This is generally accomplished by providing the reagent or liquid with a relatively short non-tortuous fluid path that generally avoids significant pressure drops, especially through the valve portion 112a.

Referring to FIGS. 4A and 4B, which illustrate one preferred valve 110a, the fluid path from the main feedline cavity 166 journeys through the actuator fitting cavity 180, the concentric feed 122, the concentric gap 164, the valve cavity 162, the valve orifice opening 184, the tip 116 and the nozzle 118. Preferably and advantageously, and as can be seen best in FIG. 4B, the axis of symmetry of the actuator fitting cavity 180 is favorably, downwardly angled with respect to the axis of symmetry of the main feedline cavity 166, thereby avoiding a sharp directional change in the fluid path which desirably reduces the local pressure drop through the cavity 180.

Preferably and advantageously, and as can be seen best in FIG. 4B and FIG. 6, by utilizing a concentric feed 122 that feeds into the concentric gap 164 the fluid enters the valve cavity 162 substantially symmetrically which ensures a substantially uniform flow distribution in the valve cavity 162. Desirably, this substantially eliminates the possibility of "dead spaces" or regions of stagnant fluid forming inside the valve cavity 162. These dead spaces can contribute to fluid isolation and entrapment, and are also favorable sites for the collection of contaminants and gaseous bubbles.

Referring to FIGS. 4A and 4B, preferably the valve cavity 162 is tapered by means of employing the tapered side wall 200. Again, advantageously, this insures a substantially smooth fluid journey from the concentric gap 164 into the valve cavity 162 and through the valve cavity 162. The tapered side wall 200 assists in gently guiding the fluid towards the valve orifice opening 184 while substantially eliminating undesirable local turbulence and significant local pressure gradients. Preferably, the valve cavity 162 is configured to minimize its volume, and hence dead space, and to have a rounded upper edge 210 to minimize turbulence, as is shown in the schematic illustration of FIG. 7. Of course, it is desirable to eliminate all or most sharp corners and edges along the fluid path through the valve 110a, though this can increase manufacturing costs.

The fluid traveling through the valve orifice opening 184 is exposed to a comparatively higher pressure drop because of the pressure difference between the inside of the valve cavity 162 and the tip 116. Preferably, the configuration and dimensions of the plunger 152 and valve seat 158 are selected to optimally minimize the pressure drop while simultaneously locally maintaining substantially laminar flow, thereby substantially mitigating the formation of gaseous bubbles and suppressing unwanted fluid mixing. In one preferred embodiment, as illustrated in FIGS. 4A and 4B, the engaging surfaces of the plunger 152 and valve seat 158 are substantially blunt and substantially rounded (fillet), respectively, and the area of the valve orifice opening 184 when the valve 110a is fully open is about $1.5 \times 10^{-8}$ m². Of course, it is also preferable, to provide the plunger 152 with a large outer dimension in the region where it engages with the valve seat 156 so that a minimal displacement of the plunger 152 results in a sufficiently large area of the valve orifice opening 184—this, preferably and advantageously, minimizes the force requirements on the solenoid actuator 114a.

Those skilled in the art will appreciate from the description so far that the pressure drop through the valve orifice opening 184 of the reagent dispensing valve 110a (FIGS. 4A and 4B) will be, under similar operational circumstances, substantially smaller than that across the valve orifice opening 54 of the prior art valve 110p (FIG. 2). In addition, in one preferred embodiment of the present invention, the tip 116 and nozzle 118 (see FIGS. 4A and 4C) are configured to further alleviate the problems associated with air/gas bubble generation and accumulation as are encountered in the prior art dispensing valve 110p of FIG. 2. As briefly mentioned before, the tapering of the tip lower portion 196 provides a substantially smooth flow transition between the tip upper portion 194, the tip lower portion 196 and the nozzle 118. This tapering minimizes local pressure drops and, hence, discourages the formation of bubbles. In addition, the tapering of the tip lower portion 196 does not provide sharp corners or edges which prevents bubble accumulation in the tip 116. Preferably, and as mentioned before, the included angle of transition θ, between the inner diameters of the tip upper portion 194 and the nozzle 118, is less than about 45° which supports in providing a gradual narrowing from the tip 116 to the nozzle 118.

Figure 8:
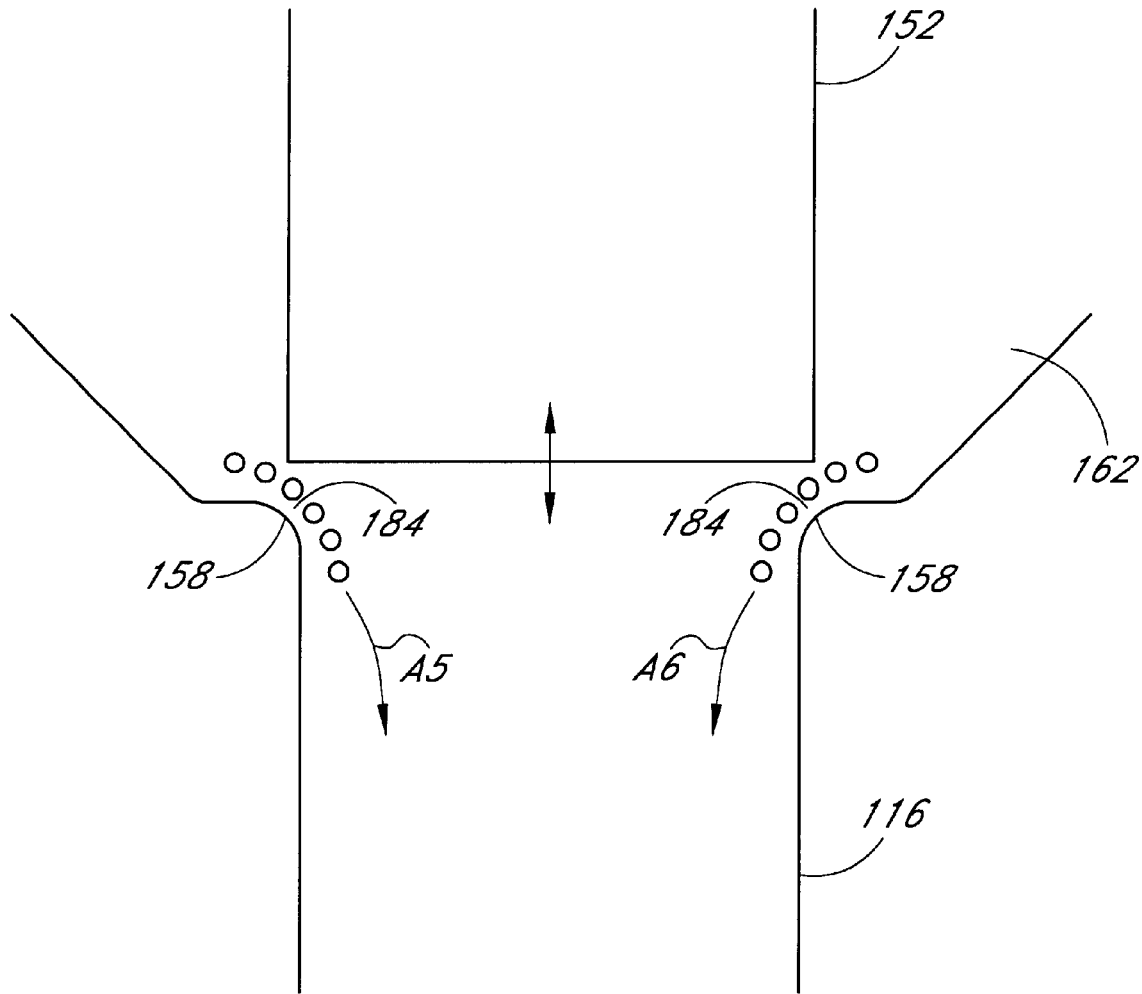
FIG. 8 is a schematic representation of the bubble passage through the valve of FIG. 4A.

The valve 110a (see FIGS. 4A and 4B), and in general the reagent dispensing valve of the present invention, substantially minimizes gaseous bubble generation and accumulation. This is best exemplified by the schematic illustration of FIG. 8. Since the pressure in the valve cavity 162 is higher than the pressure in the tip 116 there will be a tendency towards bubble precipitation in the valve orifice opening 184, when the valve 110a (FIGS. 4A and 4B) is open. Though its is desirable to totally eliminate gaseous bubble generation it is unlikely that this problem can be completely eradicated. Nonetheless, the degree of bubble generation for the valve of the present invention, such as the valve 110a, will be significantly less severe compared to conventional dispensing valves, such as the valve 110p shown in FIG. 2. This is largely due to the significantly more desirable fluid path realized in the valve 110a. Additionally, this fluid path also assists in entraining the bubbles formed in the valve orifice opening 184, and transporting them through the tip 116 and nozzle 118, thereby, advantageously removing them from the system without disrupting the operation of the valve 110a.

Figure 10:
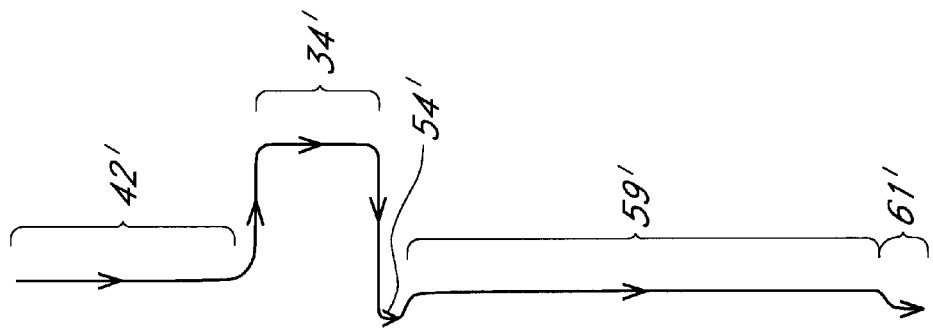
FIG. 10 is a schematic representation of the fluid path through the valve of FIG. 2.

FIGS. 9 and 10 further illustrate the advantageous fluid path through the reagent dispensing valve of the present invention, such as in one preferred embodiment the valve 110a (FIGS. 4A and 4B), compared to conventional dispensing valves, for example, the valve 110p (FIG. 2). FIGS. 9 and 10 schematically depict the fluid paths through the valves 110a and 110p, respectively. The fluid paths shown in FIGS. 9 and 10 represent averaged fluid movements, duty-cycle compensated, over several dispenses or they may be interpreted as fluid "pathlines" during a continuous dispense operation. Those skilled in the art will be aware that a "pathline" is a line which is traced out in time by a given fluid particle as it flows. See *Fundamental Mechanics of Fluids*, I. G. Currie, McGraw-Hill, 1974, Pages 40–41, incorporated herein by reference.

Again, and referring to FIGS. 9 and 10, it is obvious that the fluid path FP1 through the dispenser 12a (FIG. 4A) of the present invention provides a significantly less tortuous passageway compared to the fluid path FP2 through the prior art dispenser 12p (FIG. 2). This is especially apparent when comparing segment 112a' of fluid path FP1 and segment 34' of fluid path FP2 which represent flow through the valve portion 112a of the valve 110a (FIGS. 4A and 4B) and through the valve portion 34 of the prior art valve 110p, respectively.

Note that in FIGS. 9 and 10 segments of the fluid paths FP1 and FP2, which are labeled using like numbers, represent flow through correspondingly labelled elements in FIGS. 4A\4B and 2, respectively. Thus, referring to FIGS. 4A and 9, the fluid flowing through the main feedline cavity 166 is represented by the segment 166', and so on. The fluid path segments 180', 122', 164', 162' and 184', as schematically illustrated in FIG. 9, represent the substantially smooth fluid path through the cavity 180, the concentric feed 122, the concentric gap 164, the valve cavity 162 and the valve orifice opening 184, respectively, of one preferred valve 110a as shown in FIGS. 4A and 4B. In contrast, and referring to FIG. 10, the fluid path segments 34' and 54,' representing fluid flow through the valve portion 34 and valve orifice opening 54, respectively, of the prior art valve 110p (see FIG. 2), are undesirably composed of several sharp directional changes which create significant pressure drops through the valve portion 34 and valve orifice opening 54 and which in turn disadvantageously lead to air/gas bubble formation. Additionally, the transitions between the fluid path segments 184', 116' and 118' (see FIG. 9) are substantially smoother compared to the transitions between the fluid path segments 54', 59' and 61' (see FIG. 10) due to the improved design incorporated in the valve orifice opening 184 and tip 116 of the present invention.

One preferred embodiment of the reagent dispensing valve 110a (see FIGS. 4A and 4B) incorporates the bubble trap 120 as discussed before. The use of the bubble trap 120 provides an additional means to remove bubbles from the system and presents a further improvement over conventional dispensing valves, for example, the Lee valve shown in FIG. 2. The bubble trap 120 allows bubbles which are formed in the valve portion 112a an opportunity to move towards the cavity 168 instead of the main feedline cavity 166. It is likely that a majority of the bubbles which rise due to buoyancy forces from the valve cavity 162 will be inclined to flow into the bubble trap cavity 168 rather than the main feedline cavity 166 since, as stated earlier, the diameters and volume of the bubble trap cavity 168 are preferably larger than those of the main feedline cavity 166 and hence the gaseous bubbles are more likely to follow the path offering least resistance which is through the bubble trap cavity 168. In this manner, bubble accumulation is alleviated in the valve cavity 162 and the main feedline cavity 166, thereby permitting the valve 110a to be normally operated. In contrast, and as mentioned before, bubbles formed in conventional solenoid valves, such as the Lee valve shown in FIG. 2, can collect in the annular passage 42, thereby potentially clogging the valve 110p and disrupting normal operation.

Advantageously, and referring to FIGS. 4A and 4B, the bubbles that accumulate in the bubble trap 120 can be removed by transporting fluid in the bubble trap 120 to a sump 182. This is accomplished, with the valve 110a closed, by opening the valve 208 and operating the pump 22 in the forward direction, thereby displacing fluid through the tubing 126 to the sump 182. This also removes any bubbles that may have collected in the main feedline cavity 166 and the tubing 23. Advantageously, in this fashion, the bubbles are removed from the system without the need to reposition the valve 110a and/or the sump 182, in contrast to conventional waste dispenses which require the valve to be positioned over a waste receptacle. Desirably, the tapering of the bubble trap cavities 202 and 204 minimizes dead space in which the bubbles (or other contaminants) may reside and resist removal, and also minimizes undesirable pressure drops which may accentuate bubble precipitation in the bubble trap cavity 168. Optionally, the fluid displaced during the above-discussed bubble removal process may be fed into the reservoir 16 (see FIG. 1), as needed or desired, as opposed to discharging the fluid into the sump 182.

The bubble trap 120 (see FIGS. 4A and 4B) is especially valuable in the aspirate mode. Aspiration involves "sucking" of source fluid through the nozzle 118a by operating the pump 22 (see FIG. 1) in the reverse direction, thereby creating a negative pressure within the system. Typically the dispense apparatus 10 (FIG. 1) is filled with a wash fluid, for example, distilled water. The aspirated fluid flows through the nozzle 118 and into the tip 116, and in some cases when larger volumes need to be aspirated may even flow through the valve orifice opening 184 and into the valve cavity 162. Advantageously, and as discussed above, the preferred structure of the valve portion 112a, the tip 116 and the nozzle 118 discourages gaseous bubble accumulation. Thus, bubbles formed during the aspirate function will have a tendency to rise due to buoyancy effects and the favorable pressure gradient towards the bubble trap. As discussed before, the preferred structure of the bubble trap 120 encourages bubbles to flow in to the bubble trap cavity 168 rather than the main feedline cavity 166. Thus, once the aspiration of source fluid is complete, the dispenser 110a can be used to dispense fluid to the target site. In the situation, when significant bubble accumulation occurs in the main feedline cavity 166, the bubbles may be removed by discharging fluid into the sump 182 as discussed above. This results in minimal wastage of source fluid since most of the fluid dumped into the sump 182 will comprise of the wash fluid. In contrast, and as discussed above for such a situation, for a conventional prior art dispenser 12p (see FIG. 2) a purge operation needs to be performed, to relieve clogging due to bubble collection in the annular passage 42, that disadvantageously not only requires repositioning of the dispenser 12p and wastage of source fluid, but also the possible need to repeat the aspirate operation, all of which adds to the cost by reducing process efficiency.

Of course, it must be realized that even though the reagent dispensing valve of the present invention, such as the valve 110a shown in FIGS. 4A and 4B, has been structured to minimize bubble generation and collection, the valve 110a is still susceptible to clogging that can only be alleviated by repositioning the dispenser 12a and purging fluid, preferably, by performing a high speed continuous dispense in a waste receptacle. Those skilled in the art will readily recognize that the frequency of such purges for the valve 110a of the present invention will be substantially less compared to that for the prior art valve 110p shown in FIG. 2. This clogging of the valve 110a may occur if bubbles collect in sites, such as in the valve cavity 162, which makes it difficult to remove them by use of the bubble trap 120 or during normal dispensing operations.

Other Preferred Embodiments

In one preferred embodiment of the present invention, the blunt plunger 152 and the fillet (rounded) valve seat 158 are utilized in combination, as has been illustrated in FIGS. 4A and 4B. The blunt plunger 152 is also schematically illustrated in FIGS. 11A and 13A, and the fillet (rounded) valve seat 158 is also illustrated in FIG. 12A. The shape of the plunger, for example, the plunger 152 and valve seat, for example, the valve seat 158 is critical in determining the shape of the valve orifice opening, for example, the valve orifice opening 184 shown in FIG. 4B. In turn, the shape, among other parameters such as the size, of the valve orifice opening is critical in determining the pressure drop through the valve orifice opening and the degree of turbulence associated with the fluid flowing through the valve orifice opening. Of course, it is desirable to minimize the pressure drop through the valve orifice opening so that bubble generation is minimized. Similarly, it is desirable to minimize the degree of turbulence in the fluid flowing through the valve orifice opening so that unwanted fluid mixing is avoided.

The preferred combination of the blunt plunger 152 and the fillet (rounded) valve seat 158 optimally minimizes the pressure drop and degree of turbulence through the valve orifice opening 184 (FIGS. 4A, 4B, 11A, 12A). But, another consideration of vital importance is the security of the seal formed between the blunt plunger 152 and the fillet (rounded) valve seat 158, which will largely depend on the pressure within the system. Thus, there exists a trade-off between the shapes of the plunger and/or valve seat and the reliability of the seal formed between these two elements. Of course, the operational requirements will also play a role in determining the most suitable plunger/valve seat combination.

Other preferred shapes of the plunger and valve seat are schematically illustrated in FIGS. 11B to 13B and FIGS. 11C to 13C. FIGS. 11B and 13B show a wedge plunger 152', FIGS. 11C and 13C show a sphere plunger 152". Also, FIG. 12B shows a bevel valve seat 158' and FIG. 12C shows a flat valve seat 158". Of course, alternative shapes, which may be optionally customized based on an experimental andor theoretical study of the above mentioned considerations and operational requirements, may be utilized with efficacy. Also, a particularly shaped plunger 152, 152' or 152" may be utilized in combination with any one of the valve seats 158, 158' or 158", and vice versa, as needed or desired.

Figure 14:
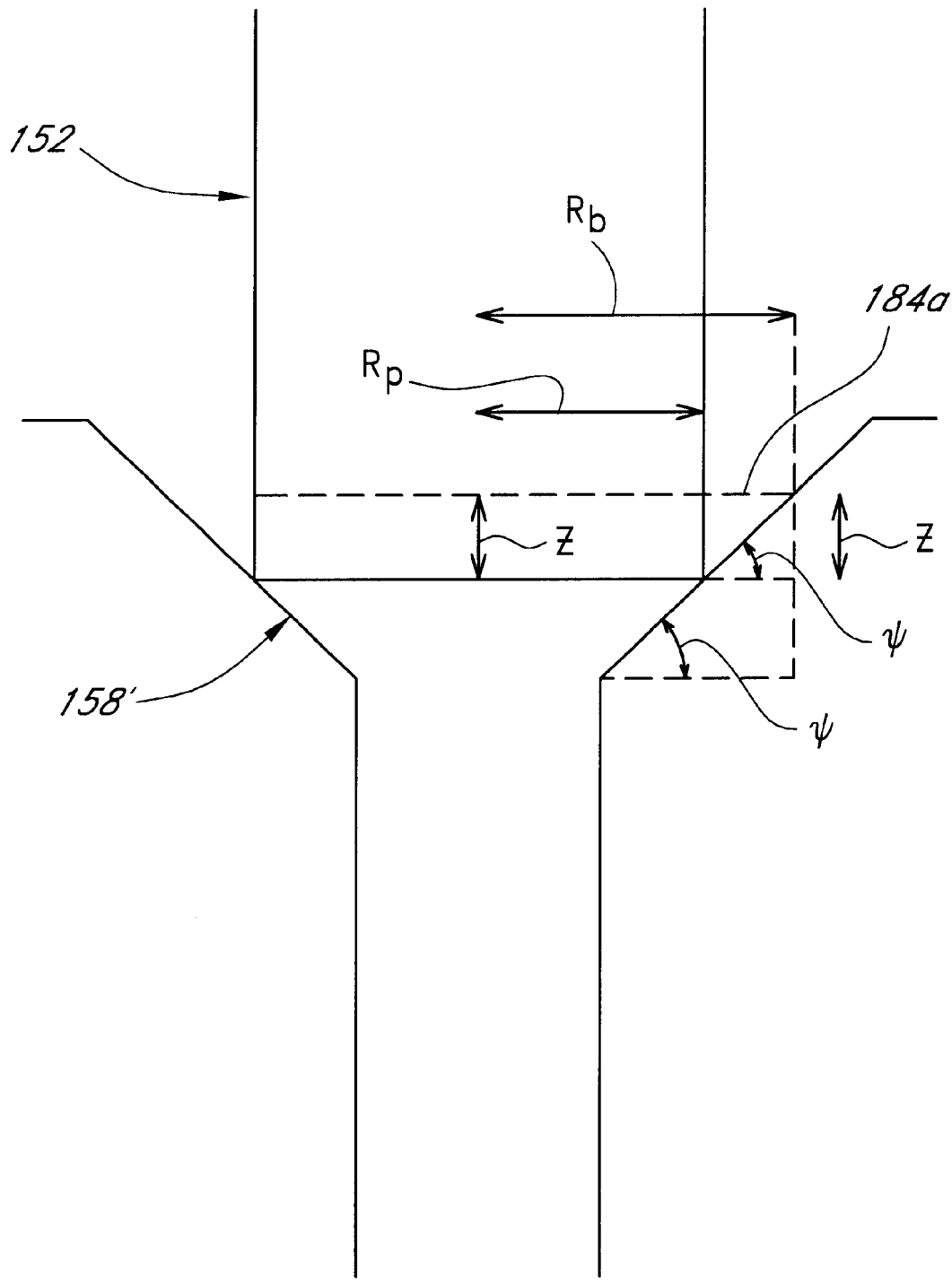
FIG. 14 is a schematic illustration of the plunger of FIG. 11A in combination with the seat of FIG. 12B.

To estimate the pressure drop across the valve orifice opening requires a calculation of the orifice area. FIG. 14 shows one example of a blunt plunger 152 in combination with a bevel valve seat 158'. The displacement of the plunger 152 is z and the radius of the plunger 152 is $R_p$. The valve seat 158' has a bevel angle $\Psi$. The radial distance $R_b$ is defined on FIG. 14. The area of the valve orifice opening 184a, A, is given by:

$$A = \pi (R_b^2 - R_p^2)$$

This expression is easily manipulated, by applying basic trigonometrical rules to the geometry illustrated in FIG. 14, to yield:

$$A = \pi \{z^2 \cot^2(\Psi) + 2R_p z \cot(\Psi)\}$$

In this manner, the area of the valve orifice opening, for example, the valve orifice opening 184a of FIG. 14, can easily be calculated by a knowledge of the plunger geometry, such as the radius $R_p$ of the plunger 152, the plunger displacement z, and the valve seat geometry, such as the bevel angle $\Psi$ of the valve seat 158'. For example, and referring to the configuration of FIG. 14, for a plunger displacement z=0.0508 mm (0.002 inches), a plunger radius $R_p$=0.1695 mm (0.0067 inches), and a bevel angle $\Psi$=45°, the area of the valve orifice opening 184a, A, is computed to be A=6.221×10$^{-8}$ m$^2$.

The pressure drop across the valve orifice opening, for example, the valve orifice opening 184a shown in FIG. 14, can be estimated by the expression:

$$\Delta P = R_o^2 Q^2$$

where, $\Delta P$ is the pressure drop, $R_o$ is the orifice resistance, and Q is the flow rate. The orifice resistance $R_o$ is defined by the expression:

$$R_o = (\rho/2)^{1/2}/AC_d$$

where, $\rho$ is the fluid density, A is the valve orifice opening area as defined above, and $C_d$ is the discharge coefficient. For example, if the fluid density $\rho=1000$ kg/m$^3$, the valve orifice opening area, A=6.221×10$^{-8}$ m$^2$ (calculated above for the geometry shown in FIG. 14), and the discharge coefficient $C_d$=0.65 (assumed typical value), then the orifice resistance $R_o$=5.530×10$^{-8}$ kg$^{1/2}$m$^{-7/2}$. Though it is desirable to know the local flow rate through the valve orifice opening, such as the valve orifice opening 184$a$, a reasonable estimate of the pressure drop $\Delta P$ may be obtained by utilizing an average value for the flow rate Q, as supplied by the pump 22 (FIG. 1). Thus, if the average flow rate Q=1×10$^{-8}$ m$^3$/sec, the pressure drop (through the valve orifice opening), $\Delta P$=30.6 Pa, which is a desirably low $\Delta P$ value.

As discussed above, the other major consideration when configuring a plunger/valve seat combination is the degree of fluid turbulence through the valve orifice opening. To quantitatively determine the degree of turbulence for fluid flowing through orifices of complicated geometry is a fairly involved task, especially since the local fluid velocity is unknown. But, those skilled in the art can qualitatively reach an opinion on the severity of turbulence by visualizing the nature of the fluid path through the valve orifice opening in conjunction with other information about the fluid properties, flow parameters and operational requirements. Nonetheless, a detailed theoretical/computational and/or experimental study may be performed to characterize the degree of turbulence through various valve orifice openings. Additionally, first order correlations (for example, based on the Reynolds Number) may be developed for several popular valve orifice opening geometries and hence used to efficiently estimate the degree of turbulence.

Figure 15A:
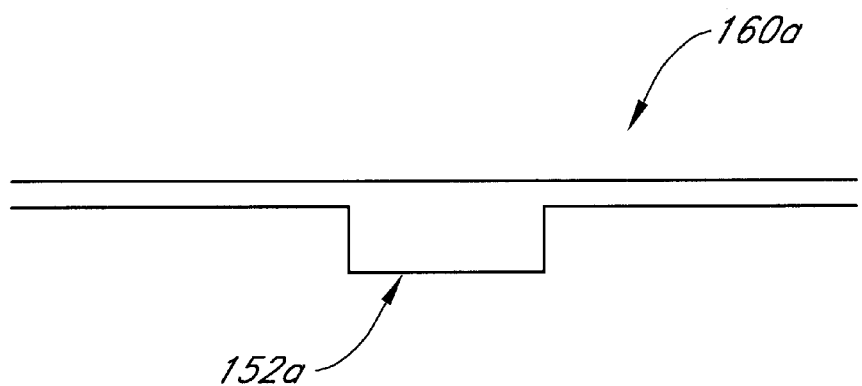
FIG. 15A is a schematic illustration of a molded "blunt" plunger and diaphragm in accordance with one preferred embodiment of the present invention.
Figure 15B:
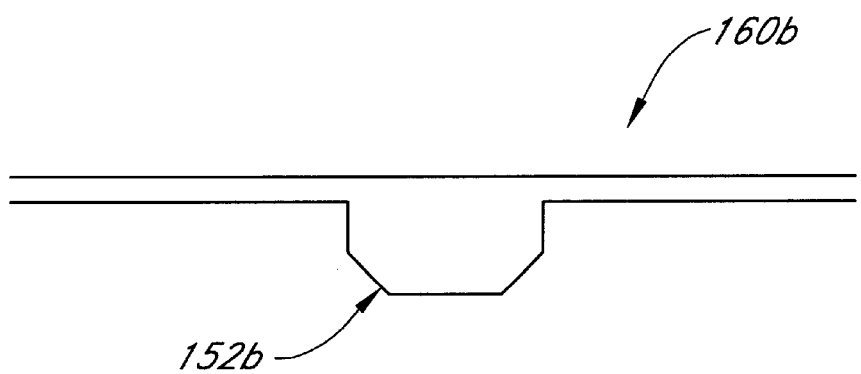
FIG. 15B is a schematic illustration of a molded "wedge" plunger and diaphragm in accordance with one preferred embodiment of the present invention.
Figure 15C:
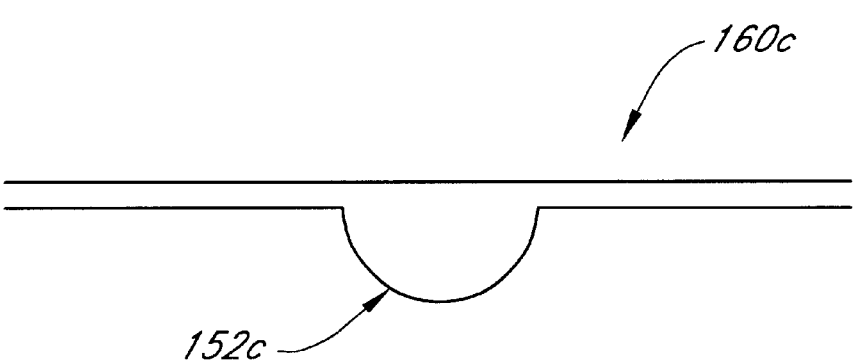
FIG. 15C is a schematic illustration of a molded "sphere" plunger and diaphragm in accordance with one preferred embodiment of the present invention.

In another preferred embodiment of the present invention the plunger portion is molded into the diaphragm to form a "molded bump" diaphragm, such as the molded bump diaphragms 160$a$ (FIG. 15A), 160$b$ (FIG. 15B) and 160$c$ (FIG. 15C). The molded bump diaphragm 160$a$ includes a blunt plunger 152$a$ as shown in FIG. 55A. The molded bump diaphragm 160$b$ includes a wedge plunger 152$b$ as shown in FIG. 15B. The molded bump diaphragm 160$c$ includes a sphere plunger 152$c$ as shown in FIG. 15C. Of course, alternatively shaped plungers may be utilized, as needed or desired. Preferably, the molded bump diaphragms 160$a$, 160$b$ and 160$c$ are fabricated from a resilient, durable, inert material such as Teflon® though other compatible materials, for example, EPDM rubber, Kevlar and the like may be utilized with efficacy.

Figure 7:
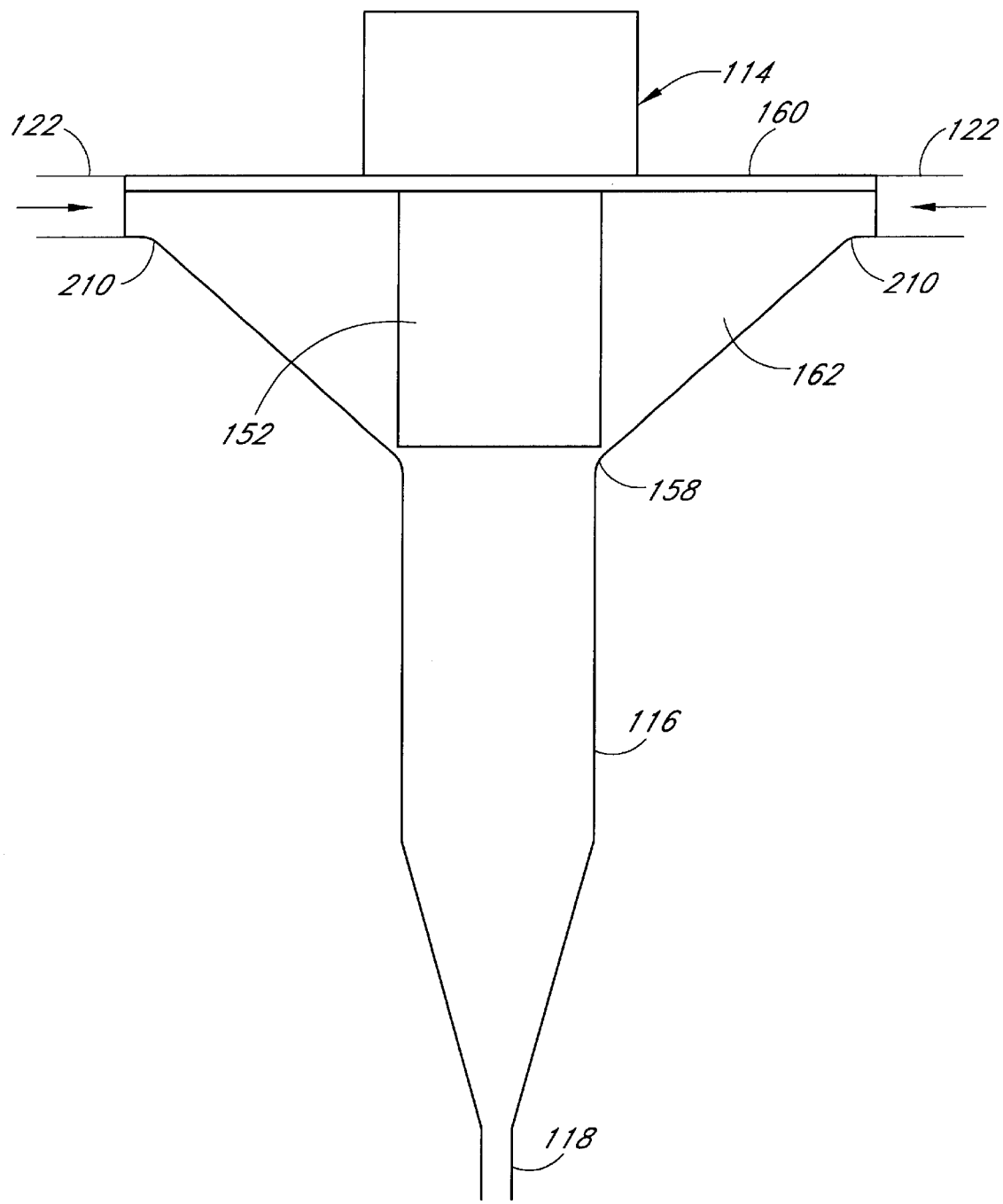
FIG. 7 is a schematic illustration of the valve of FIG. 4A.

FIG. 7 is a schematic representation of one preferred reagent dispensing valve and illustrates flexibility in choice of actuator 114. Though the valve 110$a$, shown in FIG. 4A, employs a solenoid actuator 114$a$, those skilled in the art will readily comprehend that the scope of the present invention includes other types of actuators, such as piezoelectric, moving magnet, moving coil and railgun among others. Of course, as opposed to using a linear actuator, a resonate actuator employing, for example, a spring-mass system may also be utilized. The choice of actuator is at least partially dependent on the particular application, and two important factors, among others, that dictate the selection of an actuator are the speed of the actuator and the force generated by the actuator.

Similarly, other types of flow restricters may be used instead of the valve portion 112$a$ which is shown, for example, in FIG. 4A, taking into due consideration the desired goal of simplifying the fluid path. For example, a shear valve may be used to open and close an orifice at one end of a tube while the other end is connected to a pump. In another example, a local electric field within the fluid path can also act as a flow restricter, by placing a set of electrodes near the drop-forming orifice of a tube.

Operation

Referring to the drawings, and particularly to FIGS. 1 and 4A, the reliable operation of the dispenser 12, 12$a$, including the valve 110, 110$a$, is dependent on the requirement of meeting several operational constraints. Some of these are to maintain laminar flow, minimize localized pressure drops and produce good drop detachment from the nozzle among others. As will be apparent to those skilled in the art, typically, it becomes harder to overcome these constraints as the droplet size is decreased to the nanoliter and picoliter range.

The manner in which the reagent dispensing valve of the present invention minimizes flow turbulence and minimizes undesired local pressure drops has already been discussed in sufficient detail herein above. But the operation of the valve can also have a significant effect on the quality of drop detachment. The design and dynamics of the valve and nozzle and their coupling is critical to producing good drop detachment. Of course, other fluid and flow parameters will also influence the detachment of the droplet from the nozzle.

As discussed in *Modeling Axisymmetric Flows*, S. Middleman, Academic Press, 1995, Page 100, incorporated herein by reference, the issue of whether the liquid to be dispensed will actually form into a free droplet or remain attached to the end of the nozzle is largely dependent on the Weber number. The Weber number is a dimensionless parameter and is a measure of the relative influence between inertial effects and surface tension effects, and is defined as:

$$We = \rho D U^2/\sigma$$

where, We is the Weber number, $\rho$ is the fluid density, D is a suitable length scale (in this case, the diameter at the nozzle orifice), U is the fluid velocity and $\sigma$ is the fluid surface tension. A large Weber number suggests that inertial effects are dominant over surface tension effects, while a small Weber number suggests that surface tension effects are dominant over inertial effects. Thus, drop detachment is largely dependent on the inertia of the droplet compared to the restraining force of surface tension.

The fluid velocity, U, in a strict sense refers to the local fluid velocity, though an average value of the velocity may be used to obtain a reasonable approximation of the Weber number. The average velocity through the orifice 212 of the nozzle 118 (shown, for example in FIGS. 4A and 4C) is given by:

$$U = Q/A = 4Q/\pi D^2$$

where, Q is the flow rate as provided by the positive displacement pump 22 (FIG. 1), A is the area of the nozzle orifice 212, and D is the diameter of the nozzle orifice 212. Thus, the Weber number can now be written as:

$$We = 16\rho Q^2/\pi^2 \sigma D^3$$

This shows that a high flow rate will result in a high Weber number, thereby generally providing good drop detachment. But, if the flow rate is increased the valve open time (or pulse width) has to be correspondingly decreased to maintain a constant drop size, since the droplet size in a positive displacement dispense system is given by the expression:

$$V_d = QT_v$$

where, $V_d$ is the droplet volume and $T_v$ is the valve pulse width. As a result, the Weber number can be rewritten as:

$$We = 16\sigma V_d^2 / \pi^2 \sigma T_v^2 D^3$$

For a desired fixed droplet size, the value of $V_d$ is constant. Also, a given fluid will have essentially a constant density, $\rho$, and surface tension, $\sigma$, under generally ambient conditions. And, if a particularly configured nozzle is chosen, the value of D will be constant. Thus, in this case, the valve pulse width, $T_v$, is the controlling parameter which determines the Weber number, and hence, the quality of drop detachment.

For example, to produce a 1 nanoliter (nL) drop of water (density=1000 kg/m³, surface tension=0.072 N/m) with a nozzle orifice diameter of $9.088 \times 10^{-5}$ m while maintaining a Weber number of 3, thereby generally ensuring good drop detachment, requires a valve pulse width of about 0.0001 seconds (100 μsecs). To dispense a smaller droplet, under similar conditions, would require a smaller valve pulse width while to dispense a larger droplet would require a larger valve pulse width.

The above discussion illustrates how the design and operation of the valve is a critical factor in the reliable operation of the dispenser 12 (FIG. 1), 12a (FIG. 4A). The choice of actuator 114 (FIG. 1) will largely dictate the minimum valve pulse width that is attainable. The solenoid actuator 114a (FIG. 4A) can provide a valve pulse width of about 0.0001 secs, thereby being able to produce drops as small as about 1 nL, under similar operating conditions as the above example.

The valve 110 (FIG. 1), 110a (FIG. 4A) can be used in several modes to dispense fluids, and in the aspirate mode as well. For example, the valve of the present invention may be used in dot dispensing, continuous dispensing, printing among others applications. The operation of the valve 110, 110a may be controlled by a suitable automated control system to optimize performance. The control system may also be simultaneously linked to other components of the dispense apparatus 10 (FIG. 1). Of course, the valve of the present invention may also be utilized in conjunction with conventional dispensing systems that typically adjust the reservoir pressure to control the size and/or frequency of the droplets.

Those skilled in the art will readily recognize the utility of the present invention. Many of the problems associated with conventional reagent dispensing valves are overcome or minimized by the valve of the present invention. This is at least partially accomplished by isolating the valve portion and the actuator from one another, and by providing a generally smooth flow path through the valve. In one preferred embodiment of the present invention, a bubble trap is incorporated with the valve to provide means for the removal of unwanted gaseous bubbles.

While the valve of the present invention has been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the fall range of equivalency to which each element thereof is entitled.

What is claimed is:

1. A fluid dispensing valve, comprising:
a valve portion having a plunger and a seat disposed in a valve cavity;
an actuator in mechanical communication with said valve portion and configured to open and close said valve at a predetermined frequency and/or duty cycle by displacement of said plunger, said actuator being substantially in fluid isolation from said valve portion via a diaphragm; and
bubble removal means comprising a bubble trap in fluid communication with said valve portion and adapted to receive gaseous bubbles formed within the fluid in said valve.

2. The valve of claim 1, wherein fluid path through said valve is substantially decoupled from said actuator.

3. The valve of claim 1, wherein said actuator is a solenoid actuator.

4. The valve of claim 1, wherein said valve has an inlet passage in fluid communication with said valve cavity, and a fluid path through and between said inlet passage and said valve cavity is configured to minimize bubble formation and accumulation within said fluid in said valve.

5. The valve of claim 1, wherein said plunger and said seat define a valve orifice opening and are configured to minimize bubble formation within said fluid in and adjacent to said valve orifice opening.

6. The valve of claim 1, wherein said valve cavity is generally tapered in the direction of said seat.

7. The valve of claim 1, wherein said plunger is substantially blunt faced.

8. The valve of claim 1, wherein said plunger is substantially wedge faced.

9. The valve of claim 1, wherein said plunger is substantially spherically faced.

10. The valve of claim 1, wherein said actuator comprises a movable core in mechanical communication with said plunger.

11. The valve of claim 1, wherein said plunger is molded into said diaphragm.

12. The valve of claim 1, wherein said plunger has a resilient exterior.

13. The valve of claim 1, wherein said seat is substantially rounded.

14. The valve of claim 1, wherein said seat is substantially beveled.

15. The valve of claim 1, wherein said seat is substantially flat.

16. The valve of claim 1, wherein said diaphragm is fabricated from a resilient material.

17. The valve of claim 1, wherein said fluid flows into said valve cavity through a concentric feed.

18. The valve of claim 1, in combination with a positive displacement pump, a fluid reservoir, a tip and a nozzle to dispense precise quantities of said fluid.

19. The valve of claim 1, in combination with positive displacement means, a fluid reservoir, a tip and a nozzle to aspirate a source fluid.

20. A fluid dispensing valve, comprising:
a valve portion having a plunger and a seat, said plunger and said seat being disposed in a valve cavity to define a valve orifice opening, said valve cavity being generally tapered in the direction of said seat, said plunger and said seat being configured to reduce the pressure drop through said valve orifice opening;
an actuator in mechanical communication with said valve portion and configured to open and close said valve at a predetermined frequency and/or duty cycle by displacement of said plunger, said actuator being substantially interfaced with said valve portion through a diaphragm; and bubble removal means comprising a bubble trap in fluid communication with said valve portion and adapted to receive gaseous bubbles formed within the fluid in said valve.

21. The valve of claim 20, wherein said actuator is substantially in fluid isolation from said valve portion via said diaphragm.

22. The valve of claim 20, wherein fluid path through said valve is substantially decoupled from said actuator.

23. The valve of claim 20, wherein said actuator is a solenoid actuator.

24. The valve of claim 20, wherein said valve has an inlet passage in fluid communication with said valve cavity, and a fluid path through and between said inlet passage and said valve cavity is configured to minimize bubble formation and accumulation within said fluid in said valve.

25. The valve of claim 20, wherein said plunger is substantially blunt faced.

26. The valve of claim 20, wherein said plunger is substantially wedge faced.

27. The valve of claim 20, wherein said plunger is substantially spherically faced.

28. The valve of claim 20, wherein said plunger is in mechanical communication with a movable core of said actuator.

29. The valve of claim 20, wherein said plunger is molded into said diaphragm.

30. The valve of claim 20, wherein said plunger has a resilient exterior.

31. The valve of claim 20, wherein said seat is substantially rounded.

32. The valve of claim 20, wherein said seat is substantially beveled.

33. The valve of claim 20, wherein said seat is substantially flat.

34. The valve of claim 20, wherein said diaphragm is fabricated from a resilient material.

35. The valve of claim 20, wherein said fluid flows into said valve cavity through a concentric feed.

36. The valve of claim 20, in combination with a positive displacement pump, a fluid reservoir, a tip and a nozzle to dispense precise quantities of said fluid.

37. The valve of claim 20, in combination with positive displacement means, a fluid reservoir, a tip and a nozzle to aspirate a source fluid.

38. A fluid dispensing valve, comprising:
a valve portion having a plunger and a seat being disposed in a valve cavity;
an actuator in mechanical communication with said valve portion and configured to open and close said valve at a predetermined frequency and/or duty cycle by displacement of said plunger, said actuator being substantially interfaced with said valve portion through a diaphragm; and
a bubble trap in fluid communication with said valve cavity, said bubble trap being disposed adjacent to and generally above said valve cavity, said bubble trap being configured and operable to trap and dispose of buoyant gaseous bubbles.

39. The valve of claim 38, wherein said actuator is substantially in fluid isolation from said valve portion via said diaphragm.

40. The valve of claim 38, wherein fluid path through said valve is substantially decoupled from said actuator.

41. The valve of claim 38, wherein said actuator is a solenoid actuator.

42. The valve of claim 38, wherein said valve has an inlet passage in fluid communication with said valve cavity, and a fluid path through and between said inlet passage and said valve cavity is configured to minimize bubble formation and accumulation within said fluid in said valve.

43. The valve of claim 38, wherein said plunger and said seat define a valve orifice opening and are configured to minimize bubble formation within said fluid in and adjacent to said valve orifice opening.

44. The valve of claim 38, wherein said valve cavity is generally tapered in the direction of said seat.

45. The valve of claim 38, wherein said plunger is substantially blunt faced.

46. The valve of claim 38, wherein said plunger is substantially wedge faced.

47. The valve of claim 38, wherein said plunger is substantially spherically faced.

48. The valve of claim 38, wherein said actuator comprises a movable core in mechanical communication with said plunger.

49. The valve of claim 38, wherein said plunger is molded into said diaphragm.

50. The valve of claim 38, wherein said plunger has a resilient exterior.

51. The valve of claim 38, wherein said seat is substantially rounded.

52. The valve of claim 38, wherein said seat is substantially beveled.

53. The valve of claim 38, wherein said seat is substantially flat.

54. The valve of claim 38, wherein said diaphragm is fabricated from a resilient material.

55. The valve of claim 38, wherein said fluid flows into said valve cavity through a concentric feed.

56. The valve of claim 38, further comprising bubble removal means.

57. The valve of claim 38, in combination with a positive displacement pump, a fluid reservoir, a tip and a nozzle to dispense precise quantities of said fluid.

58. The valve of claim 38, in combination with positive displacement means, a fluid reservoir, a tip and a nozzle to aspirate a source fluid.

59. A fluid dispensing valve, comprising:
a valve portion having a plunger and a seat, said plunger and said seat being disposed in a valve cavity to define a valve orifice opening, said valve cavity being generally tapered in the direction of said seat, said plunger and said seat being configured to reduce the pressure drop through said valve orifice opening, said plunger being substantially blunt faced and having a resilient exterior, said seat being substantially rounded, said plunger being adapted to seal against said seat, said fluid flowing into said valve cavity through a concentric feed;
a solenoid actuator to open and close said valve at a predetermined frequency and/or duty cycle by displacement of said plunger, said actuator being substantially in fluid isolation from said valve portion via a resilient diaphragm, the fluid path through said valve being substantially decoupled from said actuator, said plunger being in mechanical communication with a movable core of said actuator, said movable core being spring biased in the direction of said valve seat;
a bubble trap being in fluid communication with said valve cavity via said concentric feed and said cavity of said actuator fitting, said bubble trap being disposed adjacent to said cavity of said actuator fitting, said bubble trap having a cavity spaced from and disposed generally above said valve cavity, said cavity of said bubble trap being dimensioned to be substantially larger than said cavity of said actuator fitting, said bubble trap being configured and operable to trap and dispose of buoyant gaseous bubbles, said bubble trap being able to purge said fluid containing said bubbles in a sump;

whereby, said valve substantially minimizes bubble formation and accumulation in said fluid within said valve, said valve in combination with positive displacement means, a fluid reservoir, a tip and a nozzle being able to dispense precise quantities of said fluid and to aspirate a source fluid.

60. A fluid dispensing valve, comprising:

a valve portion having a plunger and a seat disposed in a valve cavity;

an actuator in mechanical communication with said valve portion and configured to open and close said valve at a predetermined frequency and/or duty cycle by displacement of said plunger, said actuator being substantially in fluid isolation from said valve portion via a diaphragm and the fluid path through said valve being substantially decoupled from said actuator; and said valve having an inlet passage generally parallel to said plunger and a downwardly angled connection port intermediate said inlet passage and said valve cavity.

61. The valve of claim 60, wherein said valve portion has a concentric feed intermediate said connection port and said valve cavity to mitigate formation of stagnant fluid sites in said valve cavity.

62. The valve of claim 61, wherein said valve cavity is generally tapered towards said seat.

63. The valve of claim 62, wherein said valve further comprises bubble removal means.

64. The valve of claim 63, wherein said bubble removal means comprises a bubble trap in fluid communication with said inlet valve portion and adapted to receive gaseous bubbles formed within the fluid in said valve.

65. A fluid dispensing valve, comprising:

a valve portion having a plunger and a seat, said plunger and said seat being disposed in a valve cavity to define a valve orifice opening, said valve cavity being generally tapered in the direction of said seat, said plunger and said seat being configured to reduce the pressure drop through said valve orifice opening;

an actuator in mechanical communication with said valve portion and configured to open and close said valve at a predetermined frequency and/or duty cycle by displacement of said plunger, said actuator being substantially interfaced with said valve portion through a diaphragm and the fluid path through said valve being substantially decoupled from said actuator; and said valve having an inlet passage generally parallel to said plunger and a downwardly angled connection port intermediate said inlet passage and said valve cavity.

66. The valve of claim 65, wherein said valve portion has a concentric feed intermediate said connection port and said valve cavity to mitigate formation of stagnant fluid sites in said valve cavity.

67. The valve of claim 66, wherein said valve further comprises bubble removal means.

68. The valve of claim 67, wherein said bubble removal means comprises a bubble trap in fluid communication with said inlet passage and adapted to receive gaseous bubbles formed within the fluid in said valve.

69. A valve for dispensing and/or aspirating a fluid, comprising:

a valve portion including a plunger and a seat within a valve cavity and operable to selectively open and close a fluid path through said valve, said valve comprising an inlet passage generally parallel to said plunger, said valve portion further including a downwardly angled connection passage intermediate said inlet passage and said valve cavity and a concentric feed intermediate said connection passage and said valve cavity;

a movable diaphragm sealingly fitted to said valve portion and in mechanical communication with said plunger; and an actuator in mechanical communication with said diaphragm and substantially fluidly isolated from said valve portion, said actuator being configured to open and close said valve at a predetermined frequency and/or duty cycle by displacement of said plunger, said fluid path through said valve being substantially decoupled from said actuator.

70. The valve of claim 69, wherein said valve cavity is tapered in the direction of said seat.

71. The valve of claim 69, wherein said actuator has a movable portion in mechanical communication with said plunger.

72. The valve of claim 69, wherein said plunger has a resilient exterior.

73. The valve of claim 69, wherein said plunger has a generally cylindrical body portion and an end face.

74. The valve of claim 73, wherein said end face of said plunger and said seat are configured to selectively create a valve orifice opening to open said valve and sealingly engage one another to close said valve.

75. The valve of claim 69, wherein said actuator comprises a solenoid actuator.

76. The valve of claim 69, wherein said actuator comprises a piezoelectric actuator.

77. The valve of claim 69, in combination with positive displacement means to dispense and/or aspirate precise quantities of said fluid.

78. The valve of claim 69, in combination with a tip having a nozzle at one end for ejecting said fluid and/or drawing said fluid into said tip.

79. The valve of claim 78, wherein said tip has an inner surface which is tapered in the direction of said nozzle.

80. The valve of claim 69, further comprising bubble removal means.

81. The valve of claim 80, wherein said bubble removal means comprises a bubble trap in fluid communication with said inlet passage and configured and operable to receive gaseous bubbles formed within said fluid in said valve.

82. A valve for dispensing droplets of a fluid, comprising:

a valve portion including a plunger and a mating seat within a valve cavity and operable to selectively open and close a fluid path through said valve, said fluid path through said valve being substantially smooth and without sharp directional changes to substantially mitigate gaseous bubble formation within said fluid;

a movable diaphragm sealingly fitted to said valve portion and in mechanical communication with said plunger;

a solenoid actuator substantially fluidly isolated from said valve portion and having a movable core in mechanical communication with said diaphragm, said actuator being configured to open and close said valve at a predetermined frequency and/or duty cycle by displacement of said plunger, said fluid path through said valve being substantially decoupled from said actuator;

an inlet passage being generally parallel to said plunger; and said valve portion having a downwardly angled connection passage intermediate said inlet passage and said valve cavity and a concentric feed intermediate said connection passage and said valve cavity.

83. The valve of claim 82, wherein said valve cavity is tapered in the direction of said seat.

84. The valve of claim 82, wherein said actuator has a movable core in mechanical communication with said plunger.

85. The valve of claim 82, wherein said plunger has a resilient exterior.

86. The valve of claim 82, wherein said plunger has a generally cylindrical body portion and an end face.

87. The valve of claim 86, wherein said end face of said plunger and said seat are configured to selectively create a valve orifice opening to open said valve and sealingly engage one another to close said valve.

88. The valve of claim 82, in combination with a positive displacement pump to dispense and/or aspirate precise quantities of said fluid.

89. The valve of claim 82, in combination with a tip having a nozzle at one end for ejecting said fluid in the form of droplets and/or drawing said fluid from a source into said tip.

90. The valve of claim 89, wherein said tip has an inner surface which is tapered in the direction of said nozzle.

91. The valve of claim 82, wherein said fluid comprises a reagent.

92. The valve of claim 82, further comprising bubble removal means.

93. The valve of claim 92, wherein said bubble removal means comprises a bubble trap in fluid communication with said valve portion and configured and operable to receive gaseous bubbles formed within said fluid in said valve.

94. A valve for dispensing droplets of a fluid, comprising:

a valve portion including a plunger and a mating seat within a valve cavity and operable to selectively open and close a fluid path through said valve, said fluid path through said valve being substantially smooth and without sharp directional changes to substantially mitigate gaseous bubble formation within said fluid;

a movable diaphragm sealingly fitted to said valve portion and in mechanical communication with said plunger;

a solenoid actuator substantially fluidly isolated from said valve portion and having a movable core in mechanical communication with said diaphragm, said actuator being configured to open and close said valve at a predetermined frequency and/or duty cycle by displacement of said plunger, said fluid path through said valve being substantially decoupled from said actuator; and bubble removal means comprising a bubble trap in fluid communication with said valve portion and configured and operable to receive gaseous bubbles formed within said fluid in said valve.

95. The valve of claim 94, wherein said valve cavity is tapered in the direction of said seat.

96. The valve of claim 94, further comprising an inlet passage which is generally parallel to said plunger.

97. The valve of claim 96, wherein said valve portion has a downwardly angled connection passage intermediate said inlet passage and said valve cavity and a concentric feed intermediate said connection passage and said valve cavity.

98. The valve of claim 94, wherein said actuator has a movable core in mechanical communication with said plunger.

99. The valve of claim 94, wherein said plunger has a resilient exterior.

100. The valve of claim 94, wherein said plunger has a generally cylindrical body portion and an end face.

101. The valve of claim 100, wherein said end face of said plunger and said seat are configured to selectively create a valve orifice opening to open said valve and sealingly engage one another to close said valve.

102. The valve of claim 94, in combination with a positive displacement pump to dispense and/or aspirate precise quantities of said fluid.

103. The valve of claim 94, in combination with a tip having a nozzle at one end for ejecting said fluid in the form of droplets and/or drawing said fluid from a source into said tip.

104. The valve of claim 103, wherein said tip has an inner surface which is tapered in the direction of said nozzle.

105. The valve of claim 94, wherein said fluid comprises a reagent.

* * * * *